(12) United States Patent
Mitchell et al.

(10) Patent No.: US 7,836,428 B2
(45) Date of Patent: Nov. 16, 2010

(54) DECLARATIVE COMPUTER PROGRAMMING LANGUAGE METHOD AND SYSTEM

(75) Inventors: David C. Mitchell, Orem, UT (US);
Dale K. Mitchell, Orem, UT (US);
Bruce P. Mitchell, Orem, UT (US);
Scott E. Hamilton, Orem, UT (US)

(73) Assignee: Bungee Labs, Inc., Orem, UT (US)

( * ) Notice: Subject to any disclaimer, the term of this patent is extended or adjusted under 35 U.S.C. 154(b) by 1321 days.

(21) Appl. No.: 11/082,204

(22) Filed: Mar. 15, 2005

(65) Prior Publication Data

US 2005/0203958 A1 Sep. 15, 2005

Related U.S. Application Data

(60) Provisional application No. 60/553,609, filed on Mar. 15, 2004.

(51) Int. Cl.
*G06F 9/44* (2006.01)
(52) U.S. Cl. ........................................ 717/117; 717/100
(58) Field of Classification Search ................. 717/100, 717/117
See application file for complete search history.

(56) References Cited

U.S. PATENT DOCUMENTS

| | | | | |
|---|---|---|---|---|
| 5,448,740 A | | 9/1995 | Kiri et al. ................... 717/155 |
| 5,628,016 A | * | 5/1997 | Kukol ......................... 717/140 |
| 5,864,862 A | * | 1/1999 | Kriens et al. ............ 707/103 R |
| 5,872,973 A | | 2/1999 | Mitchell et al. .............. 395/685 |
| 5,978,834 A | | 11/1999 | Simonoff et al. ............. 709/203 |
| 6,005,568 A | | 12/1999 | Simonoff et al. ............. 715/744 |
| 6,043,815 A | | 3/2000 | Simonoff et al. ............. 715/744 |
| 6,049,673 A | | 4/2000 | McComb et al. ............. 717/164 |
| 6,061,797 A | | 5/2000 | Jade et al. .................... 713/201 |
| 6,145,120 A | | 11/2000 | Highland .................... 717/106 |
| 6,169,992 B1 | | 1/2001 | Beall et al. .................. 707/103 |
| 6,182,277 B1 | * | 1/2001 | DeGroot et al. ............. 717/115 |
| 6,292,933 B1 | | 9/2001 | Bahrs et al. ................. 717/107 |
| 6,331,855 B1 | | 12/2001 | Schauser |
| 6,356,933 B2 | | 3/2002 | Mitchell et al. ............. 709/203 |
| 6,370,681 B1 | | 4/2002 | Dellarocas et al. .......... 717/110 |
| 6,377,973 B2 | | 4/2002 | Gideon et al. ............... 709/203 |
| 6,424,948 B1 | | 7/2002 | Dong et al. |

(Continued)

OTHER PUBLICATIONS

International Search Report for Patent Application No. PCT/US2005/08646, dated Jan. 1, 2006 (1 page).

*Primary Examiner*—Wei Y Zhen
*Assistant Examiner*—Matthew J Brophy
(74) *Attorney, Agent, or Firm*—Goodwin Procter LLP

(57) ABSTRACT

A method and system for instructing a computer in a system of a declarative computer programming language. Unlike traditional declarative languages, the programming language may be neither relational nor functional, neither procedural nor imperative. The declarative elements may be defined as a meta-description of logic and data. The basic morphology of this meta-description may be a data construct known as a Lattice. Lattices derive declarative power from their inclusion of "Attributes" and "Sites". Attributes are declarative properties that determine the internal behavior of a Lattice; while Sites are declarative data access points that establish the external relationship a Lattice may have with other Lattices, Lattice Containers, and Lattice Elements. Each of these data constructs are highly adaptable, recursive, and expandable, providing the entire language with a degree of flexibility that facilitates a very high level of abstraction.

73 Claims, 6 Drawing Sheets

U.S. PATENT DOCUMENTS

| | | | |
|---|---|---|---|
| 6,434,598 B1 | 8/2002 | Gish | 709/203 |
| 6,640,249 B1 | 10/2003 | Bowman-Amuah | |
| 6,654,784 B1 | 11/2003 | Wei | 709/203 |
| 6,654,932 B1 | 11/2003 | Bahrs et al. | 715/507 |
| 6,675,228 B1 | 1/2004 | Bahrs et al. | 719/318 |
| 6,687,745 B1 | 2/2004 | Franco et al. | 709/219 |
| 6,748,570 B1 | 6/2004 | Bahrs et al. | 715/526 |
| 6,766,333 B1 | 7/2004 | Wu et al. | 707/201 |
| 6,779,155 B1 | 8/2004 | Bahrs et al. | 715/526 |
| 6,779,177 B1 | 8/2004 | Bahrs et al. | |
| 6,782,508 B1 | 8/2004 | Bahrs et al. | 715/526 |
| 6,795,851 B1 | 9/2004 | Noy | |
| 6,806,825 B2 | 10/2004 | Andrusiak et al. | 342/185 |
| 6,829,771 B1 | 12/2004 | Bahrs et al. | 719/318 |
| 6,836,885 B1 | 12/2004 | Buswell et al. | |
| 6,847,987 B2 | 1/2005 | Case et al. | |
| 6,862,711 B1 | 3/2005 | Bahrs et al. | 715/526 |
| 6,880,126 B1 | 4/2005 | Bahrs et al. | |
| 6,886,046 B2 | 4/2005 | Stutz et al. | 709/246 |
| 6,886,169 B2 | 4/2005 | Wei | 719/316 |
| 6,886,170 B1 | 4/2005 | Bahrs et al. | 719/318 |
| 6,897,833 B1 | 5/2005 | Robinson et al. | |
| 6,901,554 B1 | 5/2005 | Bahrs et al. | 715/526 |
| 6,901,595 B2 | 5/2005 | Mukundan et al. | 719/316 |
| 6,920,480 B2 | 7/2005 | Mitchell et al. | 709/203 |
| 6,925,631 B2 | 8/2005 | Golden | 717/115 |
| 7,152,070 B1 * | 12/2006 | Musick et al. | 707/101 |
| 7,448,022 B1 * | 11/2008 | Ram et al. | 717/120 |
| 2001/0047406 A1 | 11/2001 | Araujo et al. | 709/223 |
| 2003/0046587 A1 | 3/2003 | Bheemarasetti et al. | 726/4 |
| 2003/0182363 A1 | 9/2003 | Clough et al. | 709/203 |
| 2003/0182469 A1 | 9/2003 | Lok et al. | 719/328 |
| 2003/0191799 A1 | 10/2003 | Araujo et al. | 709/203 |
| 2004/0021679 A1 | 2/2004 | Chapman et al. | 715/700 |
| 2004/0088409 A1 | 5/2004 | Braemer et al. | 709/225 |
| 2005/0060687 A1 * | 3/2005 | Ghazaleh et al. | 717/123 |
| 2005/0086608 A1 | 4/2005 | Roessler | 715/764 |
| 2005/0204340 A1 * | 9/2005 | Ruminer et al. | 717/123 |
| 2005/0251551 A1 | 11/2005 | Mitchell et al. | 709/203 |

* cited by examiner

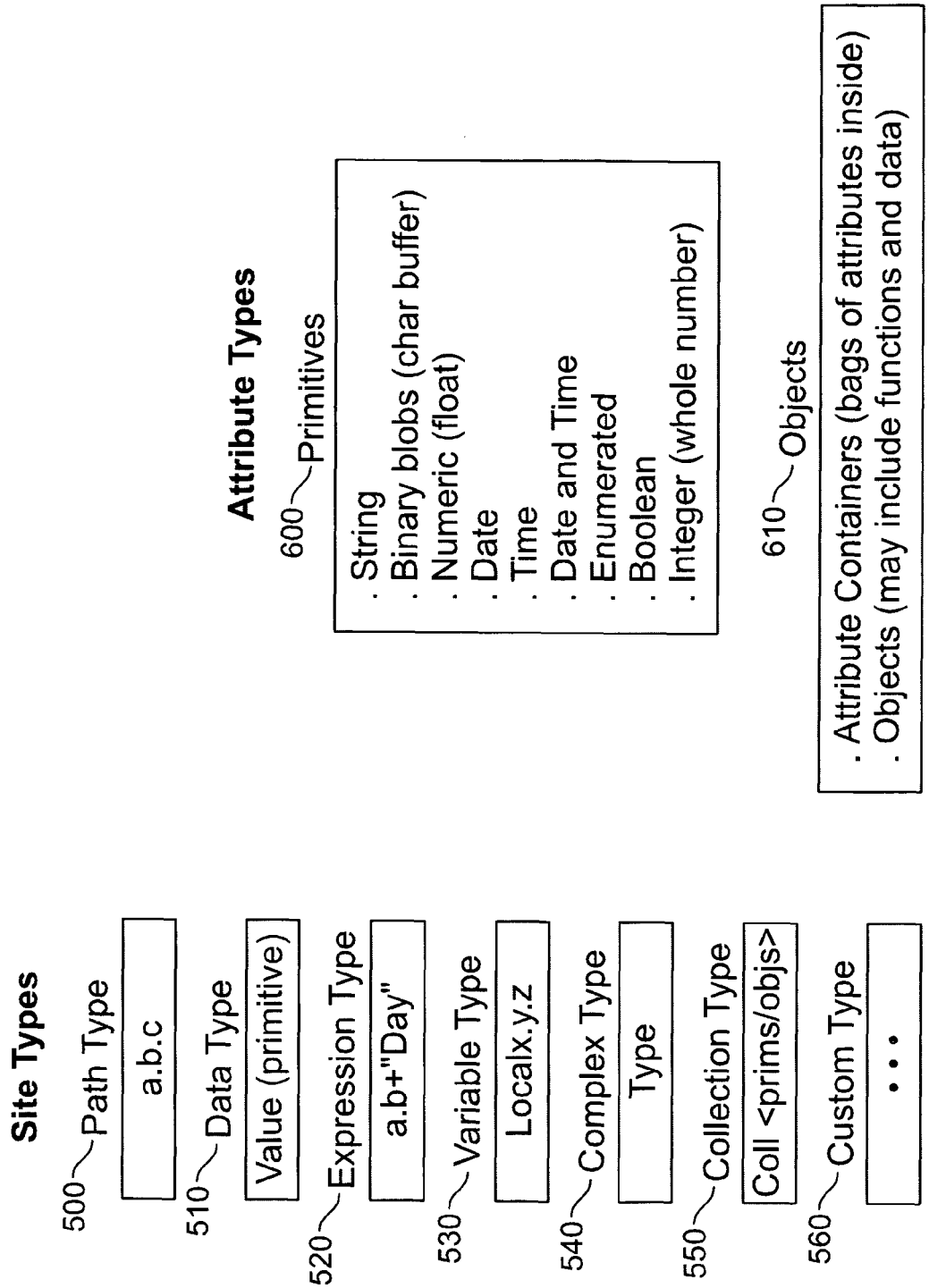

DECLARATIVE COMPUTER PROGRAMMING LANGUAGE METHOD AND SYSTEM

CROSS-REFERENCES TO RELATED APPLICATIONS

This application claims the benefit of priority from U.S. Provisional Patent Application Ser. No. 60/553,609, filed Mar. 15, 2004, the specification and figures of which are expressly incorporated herein by reference.

FIELD OF THE INVENTION

The present invention relates to the field of computer programming languages, more specifically to a method and system of structuring logic and data in a computer programming language.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights.

BACKGROUND OF THE INVENTION

Computers were originally developed as a means to accomplish certain tasks. Because of this, the early computer languages were developed on a procedural basis. The very lowest level of computer language is machine code. Machine code is often referred to as a first generation computer language or 1GL, for short. Machine code has the task of manipulating individual quanta of data known as bits to cause the machine hardware to perform a given task. Although machine code is well suited to this function, programming in machine code is both tedious and time-consuming. All other computing languages, starting with assembly languages, are abstractions from this basic level and have the aim of allowing a developer to create applications by means of a more human friendly methodology and/or interface. Assembly languages are generally considered second generation languages or 2GLs.

Development of 3GL and 4GL Languages

As part of this movement away from machine-oriented procedures and towards the world of human interactions and human friendly interfaces, third generation procedural languages (3GLs) such as FORTRAN (FORmula TRANslation), Pascal, and C were developed. More modern languages such as C++ and Java are also considered third generational languages. At the same level, imperative languages were developed as a means of better controlling the state of a computer process, particularly as it applied to databases.

Fourth generation languages (4GLs) are non-procedural. They tend to be imperative because of their early association with database systems. Some examples include Structured Query Language (SQL), Focus, and Adobe PostScript®. Still, 4GL languages represent only an incremental abstraction from 3GLs.

Declarative languages are another attempt at abstraction from a very simplistic procedure-oriented focus on tasks to be accomplished. Declarative languages do not focus on tasks as such, but on relationships between data entities. In this way, declarative languages come closer to the human world in which tasks do occur, but relationships are of primary importance.

In declarative programming, the relationships between elements in a given task dictate how that task may be accomplished. In the declarative model, relationships may be seen as specifiable behavior. In other words, a developer controls the way two data entities relate and interact through the setting of properties. Current declarative languages, however, may only be classified as 3GL and 4GL at best, as they also reveal a machine process orientation.

Internet Reveals Inadequacies of 3GL and 4GL Languages

The advent of the Internet has only served to highlight the deficiencies of traditional 3GL and 4GL languages as application development has struggled to develop tools to meet the demands of e-Business. Applications that are standalone or run only on a given platform are insufficient in this "brave new world" where the concept of "compile once, run anywhere" has become both the mantra and the elusive holy grail of application development.

Current solutions to this seemingly intractable problem are crippled by the historical debt to machine and task-oriented programming. In addition, those applications that do achieve the ability to deploy at more acceptable levels betray their machine and task-oriented origins through their poor quality user interfaces. These interfaces and their task-oriented organization are fundamentally incompatible with user expectations of relationship-based organization.

It has become clear that declarative programming methodologies offer a great advantage in the attempt to meet the need for world-wide deployment, particularly as Web services have become the accepted standard for the creation of flexible Internet applications.

Attempts have been made to overcome the gap between the need for flexible applications and the realities of 3GL and 4GL languages through the addition of declarative programming tools. Unfortunately, the declarative features on 3 and 4 GL languages only solve part of the problem.

For example, in Visual Studio .NET, a Microsoft Corporation product, there are declarative properties that a developer may set on data types such as classes and methods. These declarative properties affect behavior or instruct the compiler to generate slightly different code or more code. In .NET, webMethod is a declarative statement on a method in a class. The webMethod is an instruction to generate a Simple Object Access Protocol (SOAP) interface for the class. This is a declarative way of defining class behavior as the interface surrounds an existing element.

There are two problems with such an approach to declarative programming. First, this approach still requires developers to implement the method in terms of another language such as a 3GL or a 4GL scripting language. Second, this methodology does not fully express the business of the application logic in terms of properties.

A further deficiency of present approaches to declarative programming includes the lack of a visual development environment designed to support declarative programming.

SUMMARY OF THE INVENTION

A method for organizing data and instructions in a system of a declarative computer programming language at such a high level of abstraction from machine and assembly language that the new language may be viewed as a 5th generation language (5GL). Unlike traditional declarative languages, the present invention may be neither relational nor functional; neither procedural nor imperative.

While providing relationships between variables are an important part of the present invention, the declarative language of the present invention has a much greater degree of power and flexibility than do traditional declarative languages. This power derives from an innovative structuring of logic and data in this language.

The present invention may also be understood as a meta-description of logic and data. The basic morphology of this meta-description may be a data construct known as a Lattice. Lattices derive declarative power from their inclusion of "Attributes" and "Sites".

Attributes are declarative properties that determine the internal behavior of a Lattice; while Sites are declarative data access points that establish the external relationship a Lattice may have with other Lattices, Lattice Containers, and Lattice Elements. Each of these data constructs are highly adaptable, recursive, and expandable, providing the entire language with a degree of flexibility that facilitates a very high level of abstraction.

BRIEF DESCRIPTION OF THE DRAWINGS

FIG. 5 illustrates examples of Site types in one embodiment of the invention.

FIG. 6 illustrates two types of Attributes in one embodiment of the invention.

DETAILED DESCRIPTION OF INVENTION

In the following description, numerous specific details are set forth in order to provide a thorough understanding of the present invention. It will be apparent to one skilled in the art, however, that the present invention may be practiced without these specific details. In other instances, well-known features have not been described in detail in order not to unnecessarily obscure the present invention.

The present invention describes a method and system of instructing a computer in a declarative computer programming language. The programming language of the present invention may be used to instruct a computer regarding business logic and entity behavior in such a manner that both may be expressed in terms of declarative language constructs. These constructs may be used to define functions and the interface rules for logic and entities. The degree of relationship orientation and flexibility in the programming system of the present invention may be greater than previous computer programming languages, such that the present invention may encompass the concepts of what may be described in the art as a fifth generation computer programming language.

A. The Lattice

Figure 1:
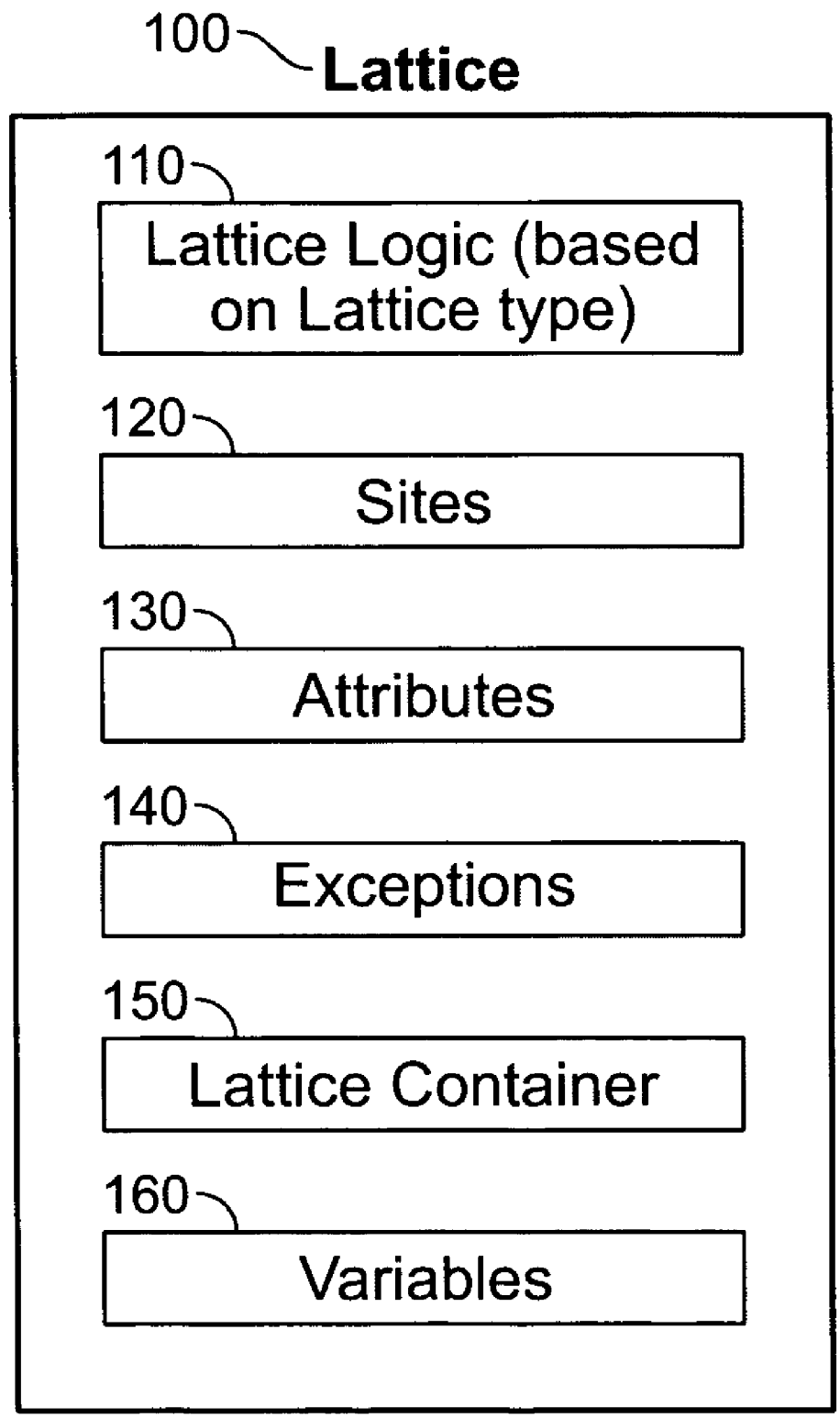
FIG. 1 illustrates the components of a Lattice in one embodiment of the invention.

FIG. 1 illustrates the anatomy of a basic construct of the language of the present invention: the "Lattice." A Lattice may be a fundamental atomic element of the computer programming language of the present invention. A Lattice may be expressed as pure behavior, data or both. A Lattice may also be understood as a single logical unit that achieves a particular computing task. Lattices of the present invention provide a powerful programming paradigm that may accomplish every aspect of a traditional programming language. Instead of the common constructs of more traditional languages, such as statements, objects, methods, functions, types, or data structures, the programming language of the present invention utilizes Lattices. A Lattice in the present invention is a programming construct that may be instantiated, and may execute, alone or in relation to other Lattices. Execution of one or more Lattices may achieve a particular runtime task, analogous to a function, procedure, or method of traditional computer programming languages. In addition to achieving a particular task, a Lattice may act as a Container within which other instantiated Lattices are held. Lattices nested within a Lattice Container are then, known as Lattice Elements of the Lattice Container.

A Lattice of the present invention may be thought of as a shorthand description of a common computational task. For example, a developer may wish to test a variable such that different steps are performed depending on the result, this may be referred to as a "conditional test." The developer may not be interested in knowing the implementation details of the underlying test, but rather only in the results obtained by the test. A Lattice program may contain a conditional declarative statement that hides the underlying program code that executes the condition, in accordance with the Attributes, types and Lattice organization selected by the Lattice program developer. The developer using the present invention achieves the test results while remaining removed from creating the underlying program code that actually executes the process, simply by selecting an appropriate Lattice and setting its properties according to the task to be performed.

The use of Lattices in the present invention may reduce programming to the selection and organization of predefined data and logic that may be specified by selecting Lattice constructs (including from a variety of Lattice types) and specifying Attributes for those constructs, then assembling the constructs together to form a hierarchy called a Lattice program. Because the language of the present invention deals with data elements in terms of their relationship to each other, and describes processes in a meta-model, there may be a great deal less code required to accomplish a given task using the present invention than using traditional languages.

B. Lattice Capabilities

The Lattice of the present invention is a flexible construct, which may be implemented in different forms in various embodiments. To create a Lattice-based computer program a developer may select and configure a specific implementation of a Lattice Container to act as a "root" Lattice Container. The developer may then place within the root other Lattice types based on options and capabilities provided by an embodiment of the invention. As illustrated in FIG. 1, Lattice 100 may include one or more of the following constructs: logic constructs (called "Lattice Logic" in the present invention) 110, data access construct (called a "Site" in the present invention) 120, property construct (called an "Attribute" in the present invention) 130, and nesting constructs (called "Lattice Containers" in the present invention) 150. To further implement the common constructions of more traditional languages in a declarative programming environment, the present invention may support "Exceptions" construct 140 within the context of Lattice 100. Exceptions 140 may be implemented as Lattice Container 150, nested within Lattice 100, and may be similar to Site 120. Alternatively, Exception 140 may be an independent construct within Lattice 100. Exception 140 may be very complex and may be of any type. All primitive Lattice types may be sub-classed from Exception 140 in the root Lattice.

Because of this, both Lattice Containers and Lattice Elements may incorporate exception handling.

Other constructs may be included in a Lattice of the present invention beyond those illustrated here, and Lattice constructs may vary depending on the type of Lattice and the particular embodiment of the present invention. One of ordinary skill in the art will realize that embodiments of the present invention may be implemented with any, all, or none of those described program constructs and may still constitute an embodiment of the present invention.

Lattices may act as both semantics and syntax for the computer programming language of the present invention, and may form a complete grammar of the language. In one embodiment of the present invention, all of the Lattices and related language constructs, including object definitions, may be packaged as Extensible Markup Language (XML) data types. The system of the present invention may also include an "engine" which provides and interprets the basic Lattice types to enable "execution" of Lattice programs to accomplish Lattice application tasks. Thus, a Lattice is neither simply a data structure nor a code construct, but may be both at once. A Lattice engine may be implemented as middleware on a web server, as a virtual machine on a single computer, or in other mechanism familiar to those of ordinary skill in the art.

An additional capability of Lattice programs of the present invention may be to declaratively create a "generate" function to produce optimized code of any other generational Language, for example Lattice programs of the present invention may generate code in C or C++. Alternatively, the language of the present invention may pass non-Lattice code through its declarative organization, and output other kinds of program code again—either in the same or a different language than that in which it was input.

C. Lattice Terminology

For convenience in describing the present invention some terminology is suggested. The present invention is not limited to this terminology, which is described solely to explain the concepts and constructs of the invention. Different embodiments of the present invention may use alternative terminologies, but the concepts explained herein are aspects of the present invention.

The programming language of the present invention may be composed of some or all of the following components: Lattices; Lattice Containers; Lattice Elements; Sites; Attributes; Execute operations; Exceptions; and Handlers.

The principle unit of semantic organization in the language of the present invention may be called a Lattice as illustrated in FIG. 1. Lattice 100 may be understood as the base class of this system. All other Lattice types in this system may subclass Lattice 100. Lattice 100 may contain one or more Lattice Containers 150. Unlike common data structures, the processing of the Lattice program occurs within Lattices 100. Lattice 100 may be instantiated in one of two modes: a Lattice Container 400 and/or a Lattice Element 420 (see FIG. 4), which may exist within Lattice Container 150. This hierarchical structure may provide the organization of a declarative computer program. In the sense of a natural language, Lattice 100 is like a phoneme which, by itself, has little meaning. Lattice Elements 420 are like words that must be formed into sentences to provide meaning. Lattice Containers 400 are like sentences.

Although Lattice Elements 420 may be thought of as words, they are more like hyperlinks, such that a single word may expand into an entirely new context ("document"). In like manner, a single instantiated Lattice (Lattice Element 420) may contain within itself another Lattice Container 400 with an entirely different set of Lattice Elements 420. This organization may become quite deep and complex, adding flexibility and power to the language of the present invention.

Lattice programs may consist of a single Lattice instantiated as a Lattice Container with associated logic, or a group of Lattices assembled hierarchically and related through instantiation. The highest level Lattice (which may be instantiated as Lattice Container 400) may thus be referred to as the "root" Lattice. Instantiated Lattice Elements within the root Lattice may therefore consist of one or more nested Lattice Elements. The Lattice Container may create the context for Lattice Elements.

Lattice Elements 420 may be of one or more primitive Lattice types described herein, or of a complex or compound Lattice type. A Lattice Element may also be thought of as a "variable" that has Lattice behavior capability associated with it. Instead of being a mere data point, a variable in the present invention may be implemented as an "object." Lattice 100 may execute and perform various functions when instantiated as a Lattice Container and/or a Lattice Element. For example, Lattice Element that is also a Lattice Container of the present invention may initialize, validate, manage state, and destroy other constructs.

Lattice instantiations may include Lattice Container 150, which may also be a Lattice Element. Lattice Elements may contain Lattice Logic 110. Sites 120 and Attributes 130 may affect internal and external behavior of Lattice Elements. Attributes may affect the internal functioning of the Lattice Element. Sites 120 may determine the relationship that a given Lattice Element may have with external Lattice Elements.

Each Lattice Element in a given instance may itself be a Lattice Container 150, or may recursively contain other Lattice Containers 150. In one embodiment of the invention, Lattice Element 420 may include a pointer to an "external" Lattice Container 400 so that Lattice Element 420 merely references another Lattice Container 400, or may recursively nest the Lattice Container 400 within itself. Thus, Lattices may be, and generally are, recursive. This recursive organization may lend great power to the declarative language of the present invention.

1. Lattice Program Elements

In FIG. 1 Lattice 100 contains "Lattice Logic" construct 110 consisting of logic that controls initialization and execution of a Lattice. The actual processing of Lattice execution may differ between different primitive Lattice types. The processing of Lattice Logic 110 makes use of Site 120 to access data in other Lattices. Attributes 130 as well as Exceptions 140 may also affect Lattice Logic 110. Exceptions 140 may contain logic to handle errors and other types of exceptions, which may transfer execution control to a parent or root Lattice.

When nested within Lattice Container 150, other individual Lattices 100 may be executed in order, from top to bottom. The execution of Lattice 100 may be thought of as a virtual method call on an object, as Lattices may fundamentally be objects.

In one embodiment of the invention, Lattice Element 100 is a dynamic object. When Lattice Container 150 executes, it executes based on Attributes 130 set on it. Because values associated with variables may change dynamically at runtime, the behavior displayed by a given Lattice Container 150 may change each time an application executes that Lattice Container.

2. Lattice Programming Tools

Figure 2:
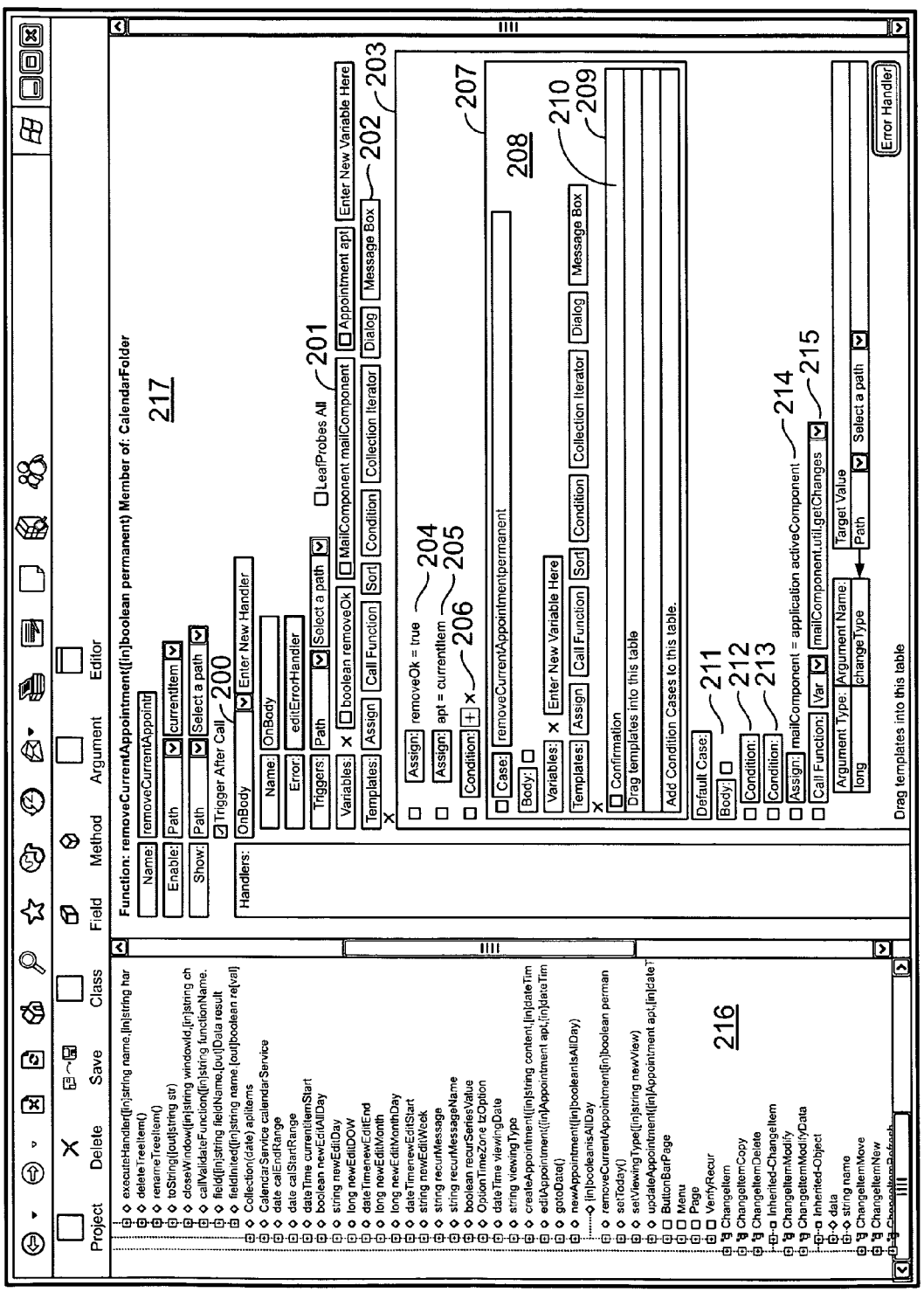
FIG. 2 illustrates an example of a graphic user interface of a design and development tool in one embodiment of the present invention.

Programs built in the computer programming language of the present invention may be developed using a visual programming environment. The present invention supports program development via a Graphic User Interface (GUI)-based program design and development tool. FIG. 2 illustrates an example of a GUI program design and development tool, in accordance with one embodiment of the present invention.

FIG. 2 shows a GUI interface having a window 216 with a hierarchically displayed list of functions, data collections, and other programming structures that a developer has configured (or initiated configuring) with the GUI declarative programming language tool. The function "removeCurrentAppointment" is highlighted in window 216 (e.g., after being selected by a developer), and a meta data configuration interface for the selected function is shown in window 217.

In one embodiment, the meta data configuration interface provides simple tools for configuring declarative programming elements (e.g., Lattices), such as pull-down menus for selection of attribute values, and icons for dragging standard declarative programming structure templates (types) into tables associated with container structures. Clickable tabs are provided to expand and minimize elements within the window.

In this example, the currently selected function is implemented as a handler (designated with pull-down menu 200 as "OnBody"). The function has a root container structure with a region 201 for designating variables for the root container context. The root container structure has a table 203, into which a developer may drag one or more of programming structure template icons 202 to configure a desired logic flow. As shown, table 203 contains a sequence of structures as follows: assignment structures 204-205; conditional structures 206, 212 and 213; assignment structure 214 and call function structure 215.

Conditional structure 206 is shown in expanded view, with table 207 containing individual case structures such as case 208. Case 208 is itself a container having a region for configuring variables for the case context, and a table 209 into which further structures may be dragged to define the logic flow within that case. As shown, table 209 includes a confirmation element 210 in minimized viewing mode. Conditional structure 206 also contains a default case 211 having its own table for establishing a logic flow for the runtime situation when none of the defined case structures of table 207 apply.

The graphical interface example of FIG. 2 illustrates how simple graphical tools, such as pull-down menus and selectable template icons, may be used to select and organize declarative structures (e.g., Lattices), as well as configuring the individual declarative properties (e.g., types, attributes, sites, etc.) of each structure. In other embodiments, different graphical tools may be used in addition to or instead of the tools shown in FIG. 2.

A developer using the language of the present invention specifies programs as the expression of behavior in terms of setting Attributes of Lattice Elements. Thus, a developer may be able to create a Lattice application in a highly visual mode, using drag and drop and visual property editors in a GUI environment. This paradigm may enable the creation of entire applications without the need to write a single line of traditional programming code. One of ordinary skill in the art will recognize, however, that it may be possible to implement every aspect of the present invention without a sophisticated GUI, or indeed in a more traditional coding format.

D. Lattice Types

Figure 3:
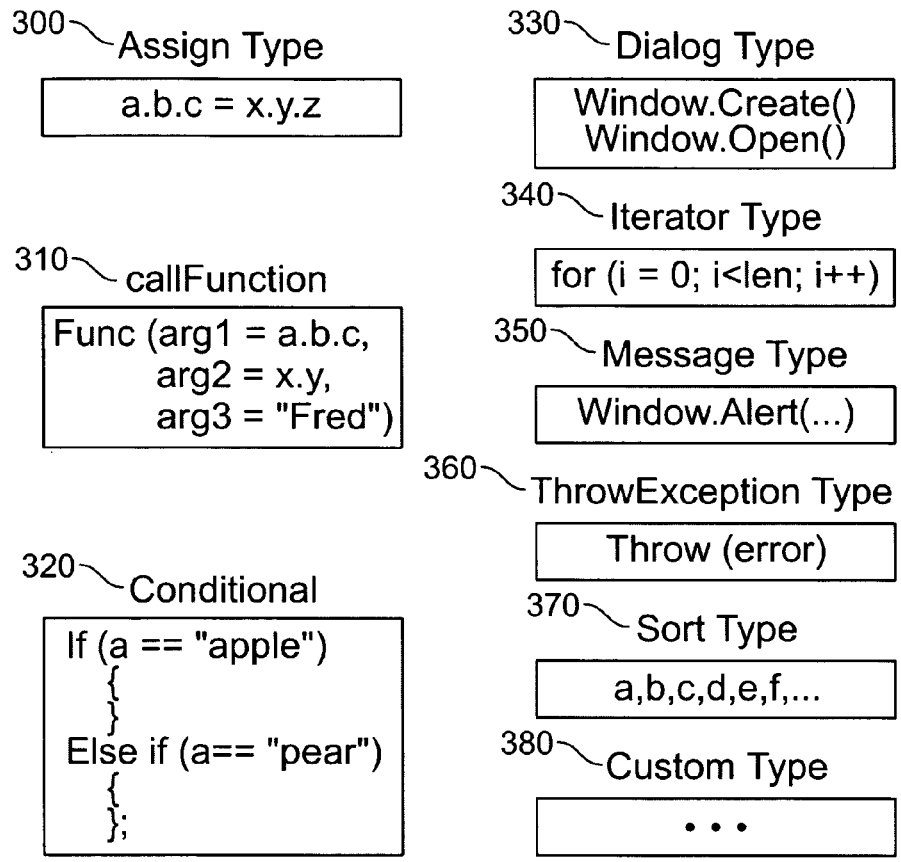
FIG. 3 illustrates examples of Lattice types in one embodiment of the invention.

FIG. 3 displays the primitive Lattice types that exist in one embodiment of the system of the present invention. The concept of Lattice types may allow Lattice programs to fully implement all the features and functionality of more traditional programming languages in a declarative language model. Embodiments of the present invention may implement certain basic Lattice types, though the invention is not limited to, nor does it require, the types described here for illustrative purposes. In fact, the present invention envisions Custom Lattice type 380, which is developer programmable.

The primitive Lattice types illustrated here as examples in FIG. 3 may be familiar to those of ordinary skill in the art as an encapsulation of primary functionality provided by 3GL and 4GL languages. The present invention may provide such preconfigured sets of functionality as programmatic shortcuts to speed Lattice application development.

1. Lattice Types Overview

Assign Lattice type 300 may provide flexible assignment operations that allow a developer to get and set data values in variables using a path-based paradigm familiar to those of skill in the art. Further, callFunction Lattice type 310 may be provided to allow a developer to invoke program "methods." Condition Lattice-type 320 may encapsulate the functionality of both an if-then-else statement and a "switch" statement familiar to developers of structured programming languages. Dialog Lattice-type 330 may be an example of a primitive Lattice type that provides a mechanism to create and open windows (or dialog boxes) in a GUI environment. Iterator Lattice-type 340 may provide a mechanism to repeat execution of a given set of Lattices. Message Lattice-type 350 may provide a mechanism to display a "message box" in a GUI. Throw Exception Lattice-type 360 may alert other Lattices of the existence of an error in a programmatic sequence. Sort Lattice-type 370 may provide a mechanism to sort data. Custom Lattice-type 380, as referenced above, may allow for additions to be made to whatever primitive Lattice types may be provided by a given embodiment of the invention.

2. Examples of Lattice Types

With very few Lattice types the present invention may be used to create a dramatically complex logic system. Traditional computer language functionality may be easily accomplished through the declarative framework of a Lattice. For example, using only three primitive Lattice types (Assign, callFunction, and Condition), a developer may accomplish almost anything achievable in a traditional coding language. With the addition of the Iterator Lattice computational equivalence to traditional programming languages may be achieved for the present invention. Other Lattice types may exist for the sake of programming convenience. Further details regarding the Lattice types are provided below.

a. Assign Lattice Type

Assign Lattice type 300 may be a very flexible assignment operation that allows a developer to get and set data using two associated Sites, one on the left hand side and one on the right hand side of the assignment operator. Assign Lattice 300 may have an "X is assigned the value of Y" (x=y) format. The Sites used in Assign Lattice 300 may be of any Site type, however, the left hand Site generally may resolve to some Site that does not have a constant value, because the operation performed by Assign Lattice 300 may be the assignment of some data to a non-constant value.

i. Copy Attributes

On even a simple assignment, there are two Attributes that may be important to an Assign Lattice—Copy and DeepCopy. For primitive data types, these Attributes are not important, since the assignment is always by value. If the assignment is referencing a complex data type, the Copy and DeepCopy apply. In such a case, if neither Copy nor DeepCopy is set, the assignment is by reference. If a developer chooses the Copy Attribute for a complex object, copy is by reference, except that the top-level object may be copied. If DeepCopy is set, the Assign Lattice actually creates a recursive copy of the designated data and assigns it to the left side of the equal sign.

Assign Lattice 300 may be among the simplest of Lattices to implement, yet may be as powerful as any other because of the functionality encapsulated in the Site types, which are described herein.

b. callFunction Lattice Type

The callFunction Lattice type 310 may provide function invocation on a method with both input and output arguments. One way to view a function may be as a system entry point (through the input and output arguments). In the present invention, a function may be thought of as having in and out parameters and a body, each of which may itself be a Lattice. The function interface is the callFunction Lattice, which uses Sites to set the in and out parameters, while the body may consist of functionality such as system calls, library access, Remote Procedure Calls (RPCs), SOAP calls, p-code invocation, etc. In one embodiment of the present invention, if the function exists within the system of the current invention, the function body takes the form of another Lattice Container. If the function is invoking functionality outside the system of the current inventions, such as an RPC, or SOAP call, etc., the body may not take the form of another lattice. The callFunction Lattice also provides the scope for the function invoked. The callFunction Lattice also allows a developer to define exception handling for the function invoked. In essence, callFunction Lattice type 310 may be a function that wraps a Lattice Container.

In the programming language of the present invention, where functions are Lattice Containers, and not merely traditional implementations of logic, the Lattice Elements inside the container are executed in a hierarchical order. Lattice Containers may include innumerable Lattice Elements (of any of the primitive Lattice types), thus a single function may be potentially very powerful.

In addition, the flexible nature of Lattices and Lattice Containers allows a developer to make use of both declarative and traditional programming language functions. callFunction Lattice 310 may act as a entry point for interaction with an underlying system by invoking a legacy function, and vice versa. Because Lattices may be object-based, an application created with the language of the present invention may take the form of a single object (or function call) within another object system.

For example, if the underlying system is written in Visual Basic (VB) and a VB element calls a function that turns out to be a callFunction Lattice 310, the nature of the callFunction Lattice as external to the VB system may not be detected by the VB system. The VB system interacts with callFunction Lattice 310 just as though it were a native function in VB. callFunction Lattice 310 also allows developers to implement business logic in terms of function definitions.

In essence, any kind of external invoking method may be accessed using the callFunction Lattice 310. The following list of functionality that may be invoked through a Lattice-based function in one embodiment of the present invention includes but is not limited to: Assembly method; legacy 3GL function call; Simple Object Access Protocol (SOAP) call; Remote Method Invocation (RMI) call; Remote Procedure Call (RPC) call; Distributed Component Object Module (DCOM) call; and Common Object Request Broker Architecture (CORBA) call.

In this way, Web applications created with the present invention may act as "glue" between disparate applications. For example, accessing SOAP interfaces through the callFunction Lattice 310 enables the creation of more complex functionality in a single integrated Web application. In such an application, functionality from legacy code on one platform (e.g., Windows) may be integrated with other legacy functionality from a different platform (e.g., Linux or Free BSD) and deployed as a single new application created specifically for a Web deployment.

c. Condition Lattice Type

The Condition Lattice type 320 provides a way to accomplish both an if-then-else and a "switch" statement at the same time. Conditional Lattice 320 may be like a switch statement that has several conditional statements in it. However, the Condition Lattice 320 may be more powerful, because every case in the switch may be an expression, not merely a value match. Each condition has a Lattice Container associated with it. If the condition is met, then that particular Lattice Container may execute. If the condition is not met, then the default behavior if specified by the developer may execute.

d. Dialog Lattice Type

The Dialog Lattice type 330 may be used to create GUI "pop up dialogs" that prompt an application user to provide input. If the pop up dialog is modal, then the next Lattice Element may not execute until the user finishes interacting with the modal dialog. In a multithreaded application, this means that Lattice Container may be stored outside of a thread. Lattice Elements 420 are by nature "context-entrant," or able to re-enter a thread at the location at which they left, once the modal dialog has been dealt with. The Dialog Lattice type 330 is an example of a generic capability to halt execution and re-enter at the point at which the execution halted.

For applications created with client/server architecture, all of this functionality may be achievable on a per-client basis. This means that while one client's server access may be delayed ("modalized") by a modal dialog, another client may continue in an active state on another thread.

Modal dialogs based on Dialog Lattice 320 do not impede or block the server at all. However, the Dialog Lattice controlling a modal dialog may be unable to continue executing until the modal interaction executes. The machinery that allows exception handling may be also what allows control over modal dialogs and threads.

e. Iterator Lattice Type

Iterator Lattice type 340 mechanisms allow Lattice programs to execute over a single Lattice Container 400 multiple times based on parameters contained within the Attributes of Iterator Lattice 340. For example, one Attribute of Lattice Element may be a value for the length of an array. Iterator Lattice 340 may allow a developer to use Site (by default, a Path type Site) as a way to access a collection of data. However, there may be no need to associate a collection with Iterator Lattice type 340. A simple "for loop" may be all that is needed. This flexibility illustrates how a Lattice with default behavior may be made to serve multiple purposes.

f. Message Lattice Type

Message Lattice type 350 may present a GUI "message box" to the developer. Message boxes may contain different types of functionality than Dialog boxes. Message Lattice type 350 may be used to notify a user of some sort of programmatic issue and the steps to a resolution (e.g., "X failed, try again.") When the user acknowledges the message by clicking the OK button, specified functionality executes (for example, a re-login).

g. Throw Exception Lattice Type

Throw Exception Lattice type 360 may act as a normal condition override to execution flow of control. The Throw Exception Lattice type 360 may allow a developer to explicitly define error conditions that otherwise would not trigger the exception handling machinery of a given Lattice.

h. Sort Lattice Type

Sort Lattice type 370 may provide a way to sort "like types" of data. Sort Lattice 370 makes use of two Site types. The first may be a Collection Site type that allows a developer to specify the type of collection to be sorted. The second Site type acts as a Sort Key that allows the developer to identify the field to be sorted.

In addition, there may be a Boolean Attribute associated with the Sort Lattice. The Boolean Attribute allows the developer to stipulate whether the sort should be accomplished in ascending or descending order.

i. Custom Lattice Type

The Custom Lattice type 380 allows for additions to be made to the primary Lattice types, as developer needs may dictate.

E. Lattice Elements

1. Lattice Containers

Figure 4:
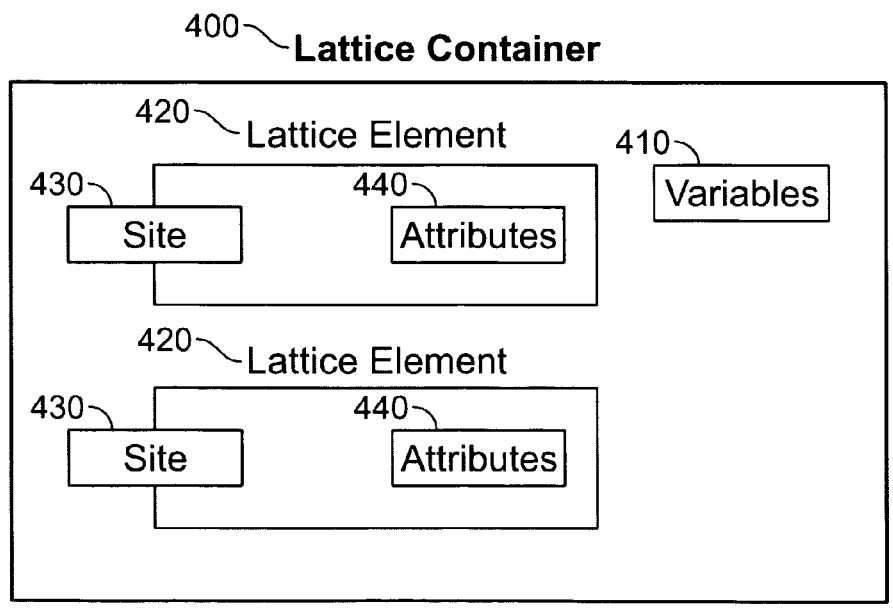
FIG. 4 illustrates a Lattice Container in one embodiment of the invention.

FIG. 4 shows the internal organization of Lattice 100 instantiated as Lattice Container 400 in one embodiment of the invention. Lattice Container 400 may contain one or more primitive Lattice types 300 through 380 instantiated as Lattice Elements 420. In one embodiment of the present invention, Lattice Element 420 may be instantiated in the context of Lattice Container 400. Lattice Container 400 has Variables 410 for access across and between Lattice Elements 420. Each Lattice Container may also contain Variables 410. Variables 410 may be specific to the internal workings of Lattice Container 400 or its scope may span Lattice Elements and/or Lattice Containers, though in one implementation of the current invention Variables 410 may exist in the hierarchical parent scope of the Lattice Container. Variables 410 are analogous to scoped variables in a procedure in more traditional programming languages in that Variables 410 may be implemented as data in an object and the values may change at runtime. Variables 410 may exist for the life of the execution of Lattice Container 400, and ensures that the state of Lattice Container 400 may be available in the scope of the instance of Lattice Container 400.

Lattice Element 420 may access Variables 410 inside its parent Lattice Container as a way to dynamically bind one of its own Site 430 to a Site on another Lattice Element within the same container. Site 430 may point to Variables 410, for example, or to data within Lattice Element 420. Variables 410 provide a way to access data between invocations of Lattice Containers.

Lattice Element 420 may also contain Attributes 440. Attributes 440 may control the behavior of Lattice Element 420. Data in Lattice Element 420 may be accessed via Site 430, a data access point. Site 430 may allow one or more Lattice Elements 420 to communicate with one another and exchange data. Site 430 may be available to access data in Lattice Element 420 from outside the Lattice Container 400, however in one embodiment of the invention this may be class context based.

In one embodiment of the invention, Lattice Container 400 is the primary element for executing functionality. As described above, Lattice Element 420 may contain within itself one or more additional Lattice Containers 400, which may contain other, nested Lattice Elements 420. This recursive organization may become quite complex and adds a high degree of flexibility and power to the language.

One embodiment of the present invention implements recursive Lattice Containers as pointers to other containers, such that a Lattice Element references another container. Alternative embodiments might instead use a pointer to create an aggregation of containers or might achieve the same recursive kind of affect by making the Lattice Element sub-classable from the class Lattice Container.

2. Lattice Container Grammar

In the programming language of the present invention, Lattice Container 400 may be seen as a statement, or a top-level grammar item. Lattice Containers complete the syntax of a particular grammatical rule. For example, Lattice Container 400 created in the instantiation of Conditional Lattice type 320 (each one is instantiated as a Lattice Container), may provide the syntax necessary to carry out the grammar in the conditional language element. Statements such as those found in procedural languages such as C++ or VB are replaced with Lattice Container 400 in the programming language of the present invention.

3. Sites and Attributes

In the language of the present invention, Lattice Element behavior and data access may be controlled by two logical constructs—Sites and Attributes. The anatomy of a Lattice consists of a Lattice Logic 110, optionally one or more Sites 120, and optionally one or more Attributes 130. The Site settings may determine data flow while Attribute settings may determine the behavior of a Lattice when it executes at runtime. A Site provides an access point to data external to its parent Lattice while an Attribute modifies variable behavior within the Lattice.

In the language of the present invention, Sites define the relationship between data elements. By using Sites in a declarative format, an assignment may, for example, consist of setting x equal to a path (x=a.b.c). This format describes the relationship between the right and left hand side of the assignment. The difference may be subtle, because a developer may specify such relationships explicitly in a procedural language. However, in this declarative approach, there may be no need to code assignments explicitly. A developer in the language of the present invention sets Sites to establish relationships among Lattice elements instead.

A Site may provide a means to retrieve and set data values. This data flow may be accomplished through a path, an object, by copy, or any other legitimate programmatic means. Because Attributes are properties that directly affect behavior (whether on Lattices or Sites), Attributes are often used to parameterize Sites and make Sites more powerful in their acquisition of data. In other words, Sites may "have" Attributes.

Sites and Attributes may be intrinsic to the primary Lattice types and all sub types. A query of an instantiated Lattice Element may return a list of all the Sites and Attributes associated with the Lattice Element. The organization of a Lattice may facilitate Site management. Because Sites may provide access to data outside of the Lattice Element scope, the Lattice Element may execute in an object context. Lattices may be implemented in terms of an object context.

F. Site Types

Sites may be declarative data constructs that provide runtime access to data outside the Lattice context. A Site provides a way to access any kind of data customarily accessible in a traditional language. Because of the need to access diverse kinds of data, there are several types of Sites. FIG. 5 illustrates possible types for Site 430 in one embodiment of the present invention. Site types supported by one embodiment of the invention are illustrated in FIG. 5.

Path Site type 500 is one example of a Site type of the present invention. Path Site type 500 may maintain a path value, which may be either relative to Lattice Element 420 or absolute. Path values may vary depending on the context of containing Lattice Element 420. Data Site type 510 may allow primitive values to be set and exchanged between Lattice Elements 420. Expression Site type 520 may allow for programmatic expressions well known to those of skill in the art. Variable Site type 530 may be used to allow access to variables, while Complex Site type 540 may allow for the creation of complex data types and structures. Collection Site type 550 may allow for collections of either primitives or objects to be created and managed by Lattice Element 420, or by other Lattice Elements. Differing embodiments of the present invention may allow different Site types to accomplish different kinds of data.

This list of base types may be extensible as needed. Examples of Site types are covered more fully below. Each Site type may have zero or more Attributes that are local to the Site. Also, as with any logical organization in this system, Sites may be recursive.

1. Path Site-Type

Path Site type 500 may contain a path to a particular element inside of an object. Another way to think of the Path Site may be as a set of definable rules that determine the manner by which a certain element may be discovered and accessed. In the case of the Assign Lattice used as an example throughout this discussion of Lattices (a.b.c=x.y.z), the path traverses an object to a.b.c.

The assignment operator may be so flexible that an assignment operator such as a.b.c=data 10, may be allowable. In this case, the Site diagram would not be a path—it would be a data. Using the Assign Lattice, a developer may set up heterogeneous Site assignments and mix and match Site types.

2. Data Site-Type

The Data Site type 510 may provide access to raw, primitive (non-complex) data. Data Site type 510 may access any kind of primitive value that may be editable.

3. Expression Site-Type

Expression Site type 520 may add flexibility to embodiments of the language of the present invention. Expression Site type 520 allows developers to create access to functionality contained in the traditional concept of an expression. For example, the Expression Site type 520 may include paths and values in the same Expression.

In addition, a developer may concatenate strings and combine them into the same Expression. For example, a developer may take the value "a+b" and concatenate the "b" with the "a."

Expression Site type 520 provides the ability to combine, prune, and graft expressions as well as to create regular expressions. For example, expressions may also be combined with a Boolean. For example, a developer could create a Boolean such as "if (x and (y==z))," where the resulting Boolean value is stored in the left hand side of the expression.

4. Variable Site-Type

Variable Site type 530 may be the only Site type enabled to access variables. Other Site types may enable the objects in the current context. Variable Site type 530 may provide a Lattice access to a value local to the scope of its parent container. A Lattice Container holds both a collection of Lattice Elements, and a local set of Variables, where the set of Variables may be merely a list of values. One of the values in such a list may have a type of Path, because Variable Site type 530 may inherit from the Path Site type. When a local value is instantiated as a complex type (such as an object) then Variable Site type 530 may be a path to allow a data value to be extracted. This path, however, may be restricted by the type of the data value that may be assigned to the variable.

5. Complex Site-Type

Complex Site type 540 provides access to non-primitive data. Primitive data may be associated with the Data Site type. As mentioned above, every Site type has associated Attributes. Complex Site type 540 may have several powerful special Attributes associated with it. For example, the following Attributes Types may be especially useful to the Complex Site type: Type; Lookup; createIfLookupFails; and Collect, described below.

i. Type Attributes

One of the Complex Site type local Attributes may be "Type." The Type Attribute allows a developer to fill in editable data value fields for every field in the Complex site. Because the data associated with this Site are complex, Type fields may include Expression, Path, Data, Collection, or even another Complex. The Complex Site may be by nature recursive, just as are Lattices themselves. The power of this Lattice language may derive from this recursiveness, and this may be very evident with the Complex site. Literally, there may be included within the assignment operator of a Complex an entire set of initializations, based on local global context and lookup. Thus, an entirely different additional application may be started based on the values associated with a Complex site.

ii. Lookup Attributes

Lookup may be also a powerful operation. When a developer chooses the Lookup Attribute, other properties become available that let the developer specify that part of the object on the right-hand side of an assignment operator has key values that identify a cache. For example, if all that may be available on the right side of the equation may be a long, but the developer knows that the long value matches some object in the system, the developer may accomplish a lookup and pass the long into a field of some other object definition. At runtime, that object may find that long in the cache, based on the ID number associated with it through the Lookup Attribute.

The power of the Lookup Attribute may be shown when a persistently bound object may be specified for lookup. In such a case, if the object does not exist in the local store, the lookup may traverse the database to find the object. If the object is not marked persistent, then the search may be accomplished only on the local cache. This may make the Lattice an abstractor for data access no matter where the data exists. This may provide much more power than may be available in a traditional language assignment statement like x=y. This kind of automated functionality may result in a tremendous reduction of overhead and, especially if the object is stored in an ODBC environment, may replace large amounts of possibly error prone code needed to access the object.

iii. createIfLookupFails Attribute

There may be yet another Attribute associated with a Complex Site that deals with the issues of lookup failure. This Attribute may be called createIfLookupFails. Its purpose may be to create a default object in the event that Lookup fails to find a given object or a data value needed within an object.

6. Collection Site Type

The Collection Site type 550 may provide a way to initialize an entire set of objects the first time the objects are accessed. Collection Site type 550 may also function as list of Sites.

Collection Site type 540 may consist of a collection of Complex Sites. This means that a developer may create heterogeneous arrays in which every element in the array may consist of a different type. This array may be initialized dynamically at runtime and contain editable properties.

G. Accessing Non-Declarative Objects

While Lattices act as declarative objects in the present invention, not all the objects referenced through Sites need be declarative. For example, if a developer imports a SOAP service into an application created with the present invention, the SOAP methods may be locally exposed as declarative statements, however, they may represent logic implemented in a traditional programming language such as Java, EJB, C++, or C. All SOAP integration may be managed in this way.

H. Attribute Types

FIG. 6 illustrates examples of types of Attribute 130 available in the system of the present invention. Attributes may allow developers to affect the internal behavior of Lattice Element 420. Examples of Attribute types may include Primitives 600 and Objects 610.

An Attribute may be analogized to the concept of selecting options for a Lattice Element the way one may select text in a word processor, and change the property of the text such that it displays in "bold" face font. "Bold" may be thought of as a property, or Attribute, of the text. Thus, in this way Attributes may be declarative because they "describe data." Attributes in the system of this present invention are often used in a more complex manner, however, where they may function to modify behavior of a set of logical statements.

Lattice program developers may specify Attributes of a Lattice Element to determine internal behavior for the Lattice Element. Further, Attributes set on Sites determine external data access behavior. Controlling external data access behavior affects relationships between Lattice Elements.

Attributes in one embodiment of the present invention may be properties that declaratively modify the runtime behavior of their parent container. For example, a developer may use the Copy Attribute of a Path-type Site within an Assign Lattice Element to modify the data that the Path-type Site brings into the scope of the parent Assign Lattice Element. The Copy Attribute declaratively redefines the assignment operation as it may be thought of in traditional languages (x=y) as a new kind of assignment operation (x=copy y). Thus, merely setting an Attribute on a Path Site may change the entire behavior of an Assign Lattice Element.

Attributes may also be used to do away with the need to either subclass a Lattice type or define a whole new Lattice type to accomplish a task not necessarily foreseen by the designer of a particular Lattice type. Although a developer may create a custom Lattice by subclassing an existing one, aggregating an Attribute directly to a pre-existing Lattice type may allow a developer to add desired new behavior to the Lattice more efficiently. Rather than create additional sequences of code in order to arrive at a new behavior, a developer need only append a different Attribute to a Lattice to change the way in which data may be acted upon. For example, if the Copy Attribute were not a member of the Assign Lattice, a developer would need to explicitly create a new object to receive assignments, then individually make every assignment from the right hand object and assign it to the new (left hand) object. This might require multiple assignment operations. And, if the object were a recursive object, this "simple" assignment operation might result in the creation of hundreds of extra objects. The aggregation of a Boolean Copy Attribute to the Assignment Lattice type may avoid the overhead and difficulty inherent in this process, and achieve all of this work in a single operation.

1. Primitive Attribute Types

FIG. 6 illustrates two kinds of Attribute types of one embodiment of the present invention: Primitives 600 and Objects 610. Examples of Primitive Attribute types 600 may include the following: String; Binary blobs (char buffer); Numeric (float); Date; Time; Date and Time; Enumerated; Boolean; Integer (whole number).

2. Object Attribute Types

Examples of Object Attribute types 610 (which may be recursive) in one embodiment of the present invention include: Attribute containers and Attribute Objects. An example of an Attribute Container can be found in the Dialog Lattice. This Attribute Container contains a set of Attributes that define the properties of a dialog such as size, position, whether or not a menu is displayed, etc. Attribute Containers may be useful because they may form cohesive sets of Attributes. An example of an Attribute Object may be an object dealing with color, where the fields of the object may represent Attributes that define color value, in some systems referred to as Red-Green-Blue (RGB) values. Separately, the RGB fields may not mean much, whereas combined together in an object; the fields may describe the color of another object that the Attribute Object may modify.

3. Recursive Attributes

Like all of the language constructs in the programming language of the present invention, Attributes may be recursive. For example, each Object Attribute 610 may be optionally specified by a developer and, if present, may have more than one local Attribute within Object Attribute 610. Primitive Attributes 600 are generally not recursive.

Attributes may also have Sites. For example, the Iterator type Lattice may have an Attribute that determines the length of an array—and this Attribute may have a Site that provides the data for the array from outside the Iterator Lattice Element scope.

I. Lattice Execution

Figure 7:
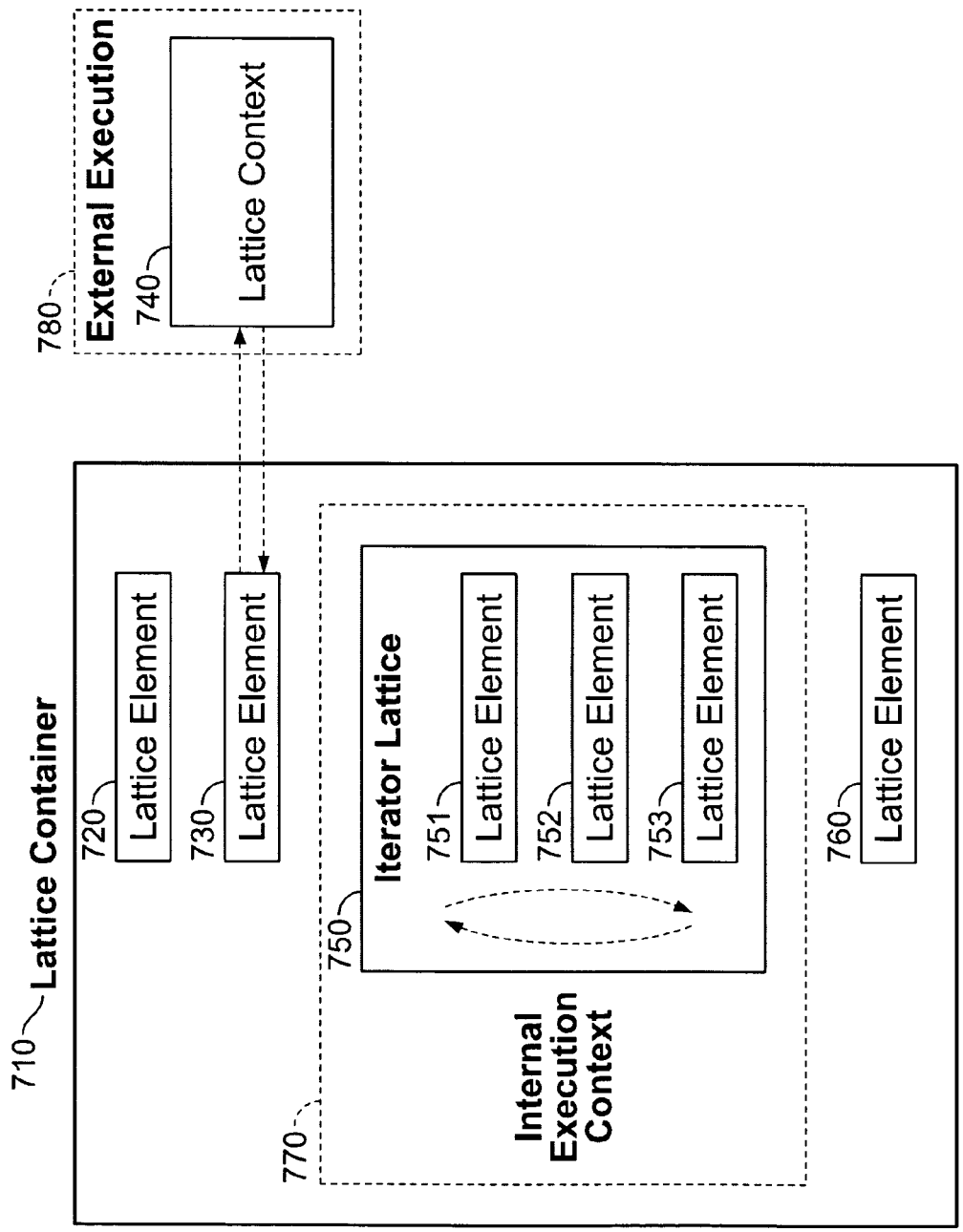
FIG. 7 illustrates an example of the flow of control in execution in one embodiment of the invention.

FIG. 7 illustrates an example of the hierarchical nature of the flow of the execution in this language. In the system of this invention, application execution may be thought of as occurring within the context of root Lattice Container 710. In the example provided in FIG. 7, Lattice Container 710 contains four additional Lattice Elements: 720, 730, 750 and 760. Because Lattice Element 750 is an instantiation of the Iterator Lattice type, this Lattice Element is also recursively a Lattice Container holding (in this example) three Lattice Elements of its own: 751, 752, and 753. The Lattice logic of Lattice Element 720 may be called when executing root Lattice Container 710. Each succeeding Lattice Element in Lattice Container 710 may then execute in descending hierarchical order. Exceptions to this general flow of control may occur in some cases, depending on the type and configuration of the Lattice Elements involved. For example, Lattice Element 730 represents an instantiation of a callFunction Lattice type, and Lattice Element 750 represents an instantiation of an Iterator Lattice type. When execution reaches the Lattice Element 730, the callFunction Lattice Element 730 invokes an execution request to External Execution Context 780. This call may invoke execution within another Lattice Container context 740, or in some other application context such as a SOAP, RPC, Java, or C call. When the callFunction Lattice returns control to Lattice Element 730, root Lattice Container 710 program execution descends to the next element, Lattice Element 750. In the example of FIG. 7, Iterator Lattice Element 750 acts as a Lattice Container. The Internal Execution Context 770 is thus invoked. In this example, Iterator Lattice Element 750 iterates within Internal Execution Context 770 until such time as the iteration condition has been met, whereupon iteration ceases, and execution flow returns to the root Lattice Container 710 where execution descends to the next element, Lattice Element 760. The execution operation ceases when the Lattice Element 760 returns control to the root Lattice, Lattice Container 710.

Thus, embodiments of the present invention may present alternative paths of Lattice Container execution. Execution may occur within the scope of Lattice Container 710 (as in the case of the Iterator Lattice 750). Execution may also occur outside the scope of Lattice Container 710, as in Lattice Context 740. Alternate execution paths may be important to the invention because the callFunction Lattice Element 730 may act as a surrogate or proxy for the actual item being executed, as in Lattice Context 740. Alternatively, the functionality executed through callFunction Lattice Element 730 might be, for example, a SOAP call where execution occurs outside any Lattice context of this system.

1. Execution Flow Order

Embodiments of the present invention may vary execution flow of control for different Lattice types. For example, the Iterator Lattice may execute repeatedly in a loop until the iteration condition may be met. Execution in a Conditional type Lattice may switch execution control directly to another Lattice outside the sequential order of normal flow control based on the parameters of the particular switch implementation.

In the case of the flow control example of FIG. 7, when execution begins for Iterator Lattice 750 it may set in motion an Internal Execution context 770 as the execution iterates through the nested Lattice Elements 751, 752, and 753, perhaps multiple times. When the conditions are met to exit the loop, execution may return to the main execution flow of Lattice Container 710, and execution may move forward to Lattice Element 760. In one embodiment of the invention, when the last Lattice, Lattice Element 760, completes execution, the execution of Lattice Container 710 may either return "normal completion", throw an exception, or suspend processing.

If Lattice Container 710 returns "normal completion" then Lattice execution may cease. Execution flow of Exception Handling is covered more fully below. Suspension may achieve a halt of execution without blocking thread execution.

2. Handlers

Like Sites and Attributes, Handlers may exist within the notion of a Lattice, and may take the form of a Lattice Container. Some Handlers may exist to handle regular application flow and functionality while others may be specialized to handle exceptions. The first two handlers covered below exist to handle normal application flow and functionality while those that follow handle exceptions.

i. Trigger Handlers

Sites may act as triggers for Trigger Handlers. For example, a developer may set a handler to trigger when the value of a path associated with a Site changes. Once enabled, the trigger may be set for the duration of the object. In the case of the Path Site type, whenever the path values change, the change invokes the exception handler. Because a path may contain expressions, and may make external calls, such handling may provide a powerful programming mechanism in the programming language of the present invention.

ii. Event Handlers

In addition to trigger handlers, there may be a type of handler associated with "onObject Events." For example, in one embodiment of the present invention onObject Events may activate handlers including, but not limited to, onInit (initialization), onDelete (deletion), onLoad (assignment), and onBody. The onBody object event may allow developers to implement a function. The onInit event may differ from the others in that it may contain instructions related to the first time creation of an object.

The onLoad event on the other hand, may deal with objects streamed, for example, from a SOAP call, and brought into a local middleware scope. Setting a handler to the onLoad event may allow a developer to ensure that initialization critical to the local context of an object occurs when an object might be loaded for the first time.

If an embodiment supports the notion of "pseudo fields" that are not part of a streamed object, then a developer may initialize the pseudo fields in accordance with the values set in an onLoad event. Thus, pseudo fields may provide the capability to add fields needed within a middleware context that may be not inherently part of a streamed object (for example a SOAP object), in contrast to the way onInit events normally occur, for example.

3. Exception Handling

Figure 8:
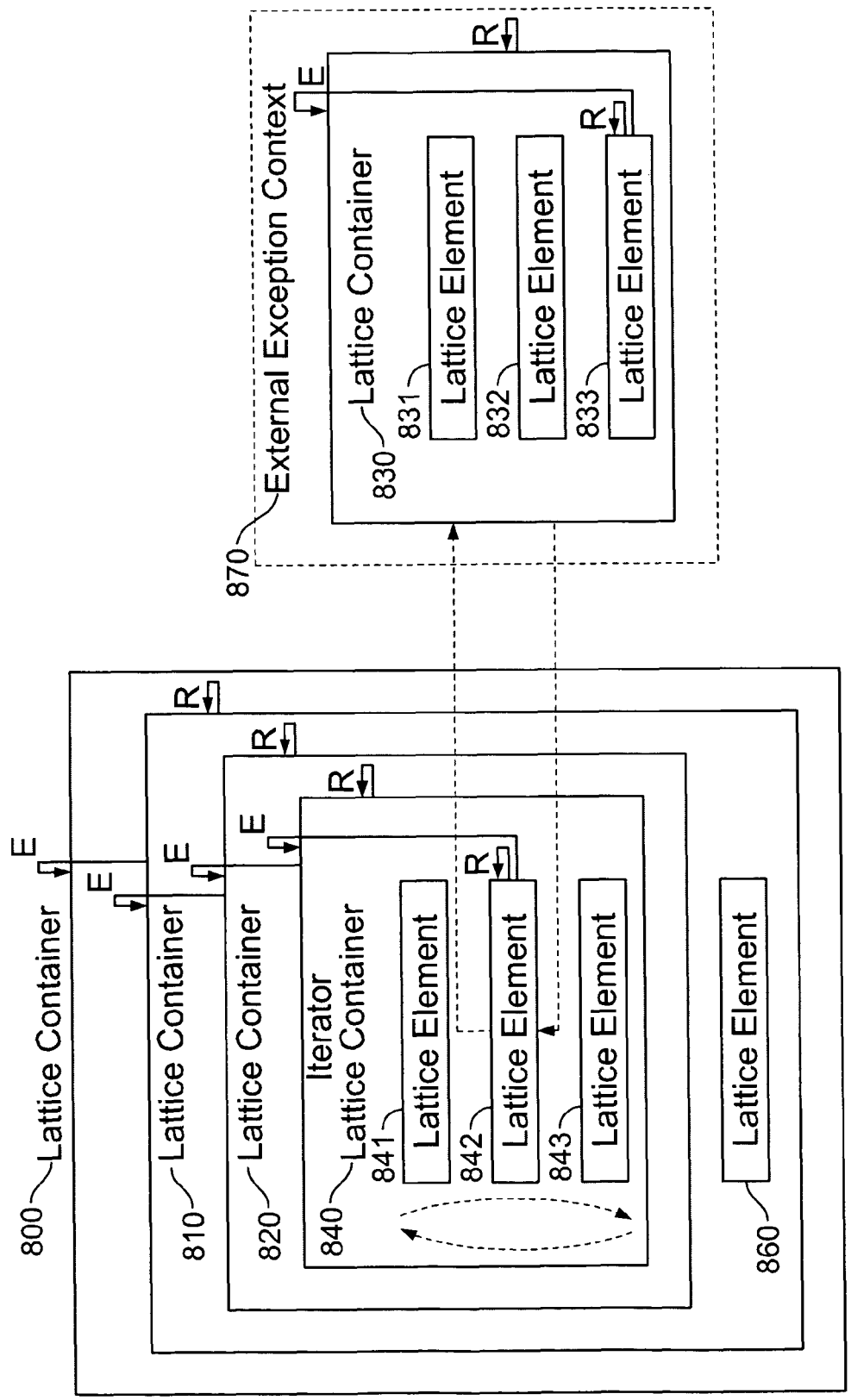
FIG. 8 illustrates an example of exception handling in one embodiment of the invention.

Like execution flow, exception handling may also reflect the hierarchical nature of the language of the present invention. FIG. 8 illustrates an example of the flow of exception handling in one embodiment of the present invention. The following description is an example only, and embodiments of the invention may implement other exception handling schemes in the context of the present invention.

Exception flow of control may take place in the context of Lattice Containers 800, 810, 820, 830 and 840. An exception not handled by a particular Lattice Container may move up to the context of that Lattice Container's parent container. In FIG. 8, the hierarchically most junior position may be held by the External Exception Handling context 870. This context may encompass Lattice Container 830, or the failure of an external procedure call. In the present invention, an exception in Lattice Element 833 may transfer control in at least one of four different manners: it may cause the Lattice to continue execution, to retry its execution, cause the exception to be passed to the parent Lattice Container, or for execution to cease. In the example shown in FIG. 8, an unhandled exception propagates from that Lattice to its container Lattice Container 830 ("R" arrow represents retry; "E" arrow represents passing exception). Together with the exception, the state of the error condition may be also passed to the parent, Lattice Container 830. Depending on properties set on Lattice Container 830, the container may or may not retry or continue execution of Lattice Element 833. The context state may piggyback the exception processing all the way up the Lattice hierarchy. If Lattice Container 830 is unable to handle the exception, the exception call may be passed to Lattice Element 842, the callFunction Lattice that originally invoked the execution of external functionality. The same would be true if the exception were to occur in a non-declarative context such as a SOAP call. If the Lattice Element 842 could not handle the exception, control flow would again pass to its parent, Iterator Lattice Container 840. In this example, each iteration of Iterator Lattice 840 may attempt a "retry" of the functionality that provoked the exception. If Lattice Container 840 cannot handle the exception, the exception and the corresponding state may be passed to the next parent container, Lattice Container 820, and so on. If the root Lattice Container 800 cannot handle the exception, the default behavior may be to suspend execution of the application and display an error message.

i. Implementing Exception Handlers

An exception handler may be a declarative construct that may be associated with a given object context. The exception handler may be itself a Lattice Container that may take arguments that are a developer-declared error type. The error handler type may be what handles exceptions as they return up each level of hierarchy in an application constructed with the present invention. Error handler components may provide the developer with the ability to define custom error handling. When an object context may change in some significant way, the handler may invoke Lattice flow within a Lattice Container. A handler may either be a trigger, or a function called on an object event.

ii. Exception Handler Uses

An exception may occur in the context of either a Lattice Element or a Lattice Container. If the Lattice Element has Lattice Containers aggregated within it recursively, the recursive hierarchy may represent a call stack for the exception handling.

For example, if a Lattice Element makes a SOAP function call, and the call may propagate a known error exception, a developer may wish to place an exception handler in the Lattice Element to handle that known SOAP exception. If there are several locations embedded within the Lattice hierarchy where a SOAP exception could occur, the developer may wish to place the corresponding exception handler at a location sufficiently high in the hierarchy to handle all the pertinent exceptions. It may even make sense to locate a particular exception handler at the global level of an application.

Suppose for example, a particular Web application has a Web service that "times out" every ten minutes, forcing a user to re-log in. After the Web service times out, any subsequent SOAP call initiated by user interaction may returns a "not-LoggedIn" exception. The developer of such an application may wish to catch that exception at the global level of the application.

iii. Try/Catch

In traditional language exceptions, there exists the concept of a logical construct called try/catch. In the example of the Web application time out above, what corresponds to a traditional catch may be when the very next the SOAP call fails after the time out occurs.

Following the above example, after a "re-login" event the developer may configure the Lattice Exception handler to retry execution within a given Lattice Element context at the point where the exception occurred, or in other words, restore the program context.

This novel approach allows the developer to return the application to restore the context of the "try" Lattice. Further, under such a scheme there may be no need to access the cache to find the location in the application at which the program timed out, because the context is preserved. In other words, the cache may "throw" back into the "try."

Although the functionality of Lattice program exception handling in some embodiments of the present invention may be similar to traditional catch processing, Lattices provide the additional ability to execute within the cache (in the context of the exception handler) after the user re-logs in. If the handler already in the cache repairs the state from where the time out occurred, the handler may make a request to the system that threw the exception in the first place to repeat the try body. If successful, the application flow may continue as though the failure never occurred. This aspect of the present invention may reduce the coding required to produce equivalent functionality in more traditional programming languages.

J. Writing Lattice Programs

The following example of Lattice development using one embodiment of the present invention is provided to clarify the use of Sites, Attributes and variables in Lattice programming of the present invention. The root of a Lattice-based application, as described above, may embody a Lattice Container. A basic Lattice implementation may have by default any of the Lattice constructs illustrated in FIG. 1: Lattice Logic 110 (0 or more), Sites 120 (0 or more), Attributes 130 (0 or more), Exceptions 140 (0 or more), and Lattice Container 150 (0 or more). A developer using the system of the present invention may change the meta-data for a Lattice instance (whether Lattice Container and/or Lattice Element) created at design time. However, when the Runtime Lattice Instance is created, variable values may change dynamically. While design time is traditionally separated from runtime, in the system of the present invention, design time may also occur at runtime, because Lattice programs may modify themselves when they execute.

The Assign Lattice may provide an example of the general principals used to implement a Lattice program. First, a developer using this declarative language implements a Lattice called Assign, which inherits from the base Lattice class. The base Lattice class may contain a set of virtual functions including execute and init within the class XML data. Sites may be defined within the subclass of the base Lattice, in this case the Assign Lattice. Because all Lattices inherit from the base Lattice, all Lattices contain "get" and "set" capabilities. Additionally, because the ways in which Lattices are laid out may vary in different embodiments of the present invention, it may be quite possible to combine these get and set functions within a single object.

The following sections detail other considerations and some advantages of programming in the programming language of the present invention:

1. Lattice Program Initialization

There may be a virtual method on Lattice called "init" (actually, "set" and "get"). The set passes XML data into the Lattice, and get returns XML data from the Lattice. Doing a get on a Lattice returns all information associated with that Lattice. This may mean that get and set may be implemented as Sites in the language of the present invention.

2. Lattice Program Scope

With regards to the variable scope of the external functionality invoked, the callFunction Lattice may act in a manner similar to traditional languages. What may be external has no scope. In other words, the callFunction Lattice does not rely on the variable scope of those variables passed in through the associated Site in and out parameters. This may be just like what occurs in a traditional language. In a traditional language, when another function may be invoked, there may be no inheritance of variables.

That may be not the case with variables belonging to Lattices embedded within the scope of the Lattice Container. Embedded Lattices inherit all of the variables of the containing Lattice parent. For example, the Iterator Lattice 750 of FIG. 7 inherits the variable scope of the parent context of Lattice Container 710. In other words, inside the Iterator Lattice bodies, the variables defined in the parent Lattice may be accessed. This would not be possible with a Lattice accessed externally through the callFunction Lattice. Once the callFunction Lattice returns an argument, the execution returns to the main execution flow.

3. Meta-Lattice Types

For every Lattice type that exists, there may be a corresponding meta-Lattice type. The meta-Lattice may be the object acted upon by the properties a developer sets on a given Lattice Element at design time. The design time object may actually be a separate class called MetaLattice. In other words, for both the base Lattice and the Assign Lattice type, there may be a design time meta-Lattice that may be paired with the runtime Lattice Element.

There are three possible implications to such an implementation: (1) The runtime Assign Lattice Element may subclass MetaAssign; (2) If the MetaAssign Lattice type has both a get and a set method, then the runtime Assign Lattice Element may access these through getMeta and setMeta methods; and (3) The getMeta and setMeta methods may take MetaAssign as an argument This organization may create a coupling between a meta-Lattice type and the corresponding runtime Lattice Element.

The existence of the meta-Lattice creates an opportunity to define properties at design time. At runtime, the Lattice instance may be what actually executes the Sites and Attributes set on it during the design process. This organization may parallel the relationship between classes and objects in traditional object-oriented languages.

Meta-Lattice types may also be responsible for instantiating a Lattice Element runtime instance, which they may do through a "factory" method. When a particular Lattice Element may be invoked, the corresponding meta-Lattice may return the Lattice Element runtime instance already initialized. For example, if a set instance is needed, the meta-Lattice may create and return a setMeta result. This means that meta-Lattices may not be used solely at design time since developers may use a meta-Lattice to create instantiated runtime objects. A meta-Lattice class may be an abstraction of a given Lattice Element runtime instance. This allows the manipulation of a Lattice without the need to directly access the Lattice.

4. Illegal Assignment and Dynamic Casting

While it may also be possible to use paths on either side of an assignment in traditional languages ("dotting" through an object), there may be no inherent validation of the paths in the assignment in doing so. On the other hand, the Assign Lattice of the present invention may restrict the possibility of assigning non-equivalent types. For instance, in the assignment path example above, if the variable z may be of a different type than c, the Assign Lattice definition would disallow the assignment. This automated type checking and validating ensures that a developer cannot unwittingly introduce an invalid path.

For example, if the variable c may be an object, then z also must be an object or a subtype of an object. However, a long integer may be set equal to a short integer because the Lattice engine may be able to transform one type to the other. In like manner, a string may be set equal to a long integer or other numeric type (and vice versa), because the Lattice engine may handle these kinds of transformations.

This ability to cast data types that are related to one another exposes some of the power of the programming language of the present invention. The Lattice's ability to dynamically cast like data types obviates a great deal of code usually required for type casting in strongly typed traditional programming languages. Thus, Lattices may provide the flexibility of traditional languages, while creating shortcuts and preventing errors that are easily made in more traditional languages.

5. Nullable Exceptions

In addition, automated property validation reduces debugging times. For example, the Assign Lattice machinery may be able to accomplish validation checking on fields other than data types. If a developer marks the sub element y in the path, x.y.z (in the assignment operation a.b.c=x.y.z) as notNullable (always valid), then if element y resolves to a null value at runtime, the Assign Lattice may throw an exception. In one embodiment of the present invention, allowing primitives to be set to Null may be forbidden. Then, if a developer sets a Primitive to Null, an exception may be thrown. Thus, in one embodiment of the invention, runtime checking may be implemented by forbidding Primitives by being set to Null.

Likewise, if the values of the path are valid up to z, but z happens to contain no data, then when z may be assigned to c an exception may also be thrown. In this way, illegal assignment may be determined at runtime. Assignment errors such as these are ones compilers often allow. The reduction of such errors in this declarative language provides a degree of validation and control undreamt of in a traditional language.

The value of this innovation in computing language becomes even clearer when it may be considered that in many object binding data models, the table column in the database may also be marked notNullable. If the object binder used to persist data in the table may be set to null because of human error (by a developer failing to look back at the meta definition for the field), an invalid state may be created. This invalid state may create much extra work for a developer trying to determine the cause for it. Such an error may be easily made in Java, C++, VB, etc. The automated validation in this Lattice-based declarative language prevents this from happening, or even being a concern.

All of the automated grammar validation may occur within some object context. In one or more embodiments of the present invention automated grammar validation may lie within a middleware context, although alternative embodiments may not restricted this validation to middleware. For example, such validation may be accomplished within the context of JavaScript.

6. Developer Determined Conditions

The exception handling machinery may be very flexible. Developers may define exceptions to be handled on any given Lattice. For example, suppose a developer defined an exception on an Assign Lattice Element where an exception occurs if the right hand value may be null. If the assignment x=y fails (because y may be null and x may not receive null values, the developer may handle the right hand side null value by assigning zero to the left hand value. This solution resolves that particular exception and there may be no need for further exception handling.

A developer may also dictate whether or not the Lattice may be allowed to continue executing after an exception may be thrown. This means the developer may control application flow based on the throwing of an exception.

For example, if a login fails, the Lattice code may allow a developer to explicitly direct that an exception should be thrown based on an onFail event. In the exception handling machinery, the developer may declaratively choose whether the login should attempt to re-execute, pop up a new login dialog, display an error message, or take some other action.

Exceptions may call other SOAP services and may prompt a new user login if a SOAP service times out. If the error type at the top level of a SOAP call may be loginExpired, an exception may prompt a user to re-log in, and then continue to run the application. In this context, continue may mean skip to the next Lattice Element, or retry execution of the one where the exception was thrown.

If a developer does not include exception handling in a given Lattice, the default behavior may be for the exception to work its way up the inheritance tree to the parent container of the exception. Likewise, a developer may purposefully specify how high up an inheritance tree a given exception may be handled. All of this may be accomplished declaratively through property settings.

K. Lattice Development Systems

In one or more embodiments of the present invention Lattices are not compiled. The Lattice Logic and Attribute settings are simply executed through an object at runtime. Other embodiments may choose a compiled implementation. Lattices of the present invention may not require compilation because the Lattice constructs, including Attributes and Sites, are sufficient on their own to execute the application.

The programming language of the present invention may provide a bond between disparate object systems, which facilitates creating interactive Web applications where various components of the application are created and running in orthogonal object systems. The language of the present invention may act as 'glue' that binds these dissimilar objects to one another.

While one embodiment of the present invention may suggest data be stored in XML data types, other formats are contemplated, and would produce similar results. SQL format, text file format, or any kind of property-based format may be used to implement the language of the present invention, and the invention is not limited by choice of data storage format. Further, while one embodiment of the present invention contemplates implementing a Lattice development tool and engine in an object-oriented language such as C++, the invention may be developed in any computer programming language.

Because this language may be based on the concept of an object, it may be possible, using this new declarative language to create an entire application with a root that may be contained within a single Lattice Container instantiation that may be expressed as an object. This may be possible because a runtime kernel may encompass the entire Lattice engine. Such a configuration makes it possible to tie the system of the present invention into another object system. Examples include such diverse systems as VB, C++, NET, Java, CORBA, etc. The runtime kernel may be the Lattice runtime engine. As long as the Lattice runtime is included within another object system, it is may be possible to have an entire Lattice-based application inserted within another object system. The wrapping object system may then access and use the entire declarative application just like any other object native to the wrapping system.

For example, if a developer were to implement the Lattice kernel wrapper in COM and incorporates the kernel within the VB object system, a "newObject" call in VB may create declarative "objects". The VB system in effect executes Lattice Containers. This is actually the method (using C++ instead of VB) that was used to create one implementation of the language of the present invention.

The base object DLL that may be the object library in this language may contain a set of runtime elements. These runtime elements may define all of the Lattice machinery. The root object classes, MetaObject and Object, may actually be orthogonal to the Lattice machinery. They may be inherently separate from the Lattices. There may actually be a separate Lattice LIB called LatticeLib, which has these entire primary Lattice types defined within it. That is what may make this declarative language embeddable in non-declarative languages.

Some object systems may be easier to integrate with than others. For example, this language may be embedded as is within the context of any compiled object system as long as there is runtime accessibility to the object interface. Object systems that provide this inherent runtime accessibility may include all of the managed code servers (for example, Java servers and VB systems). On the other hand, older object systems like C and C++ that may have no runtime type information exposed may be more difficult to integrate into. Integration with these older systems may be possible, however, using code generation that may be around, but may not be in, the Lattice stub.

While this current implementation of this language may assume the Lattices are always operating in the context of some object system, there may be nothing about this system that demands this. For example, shell scripts may be a legitimate way of accessing an operating system that is engaged in batch processing. In the same way, it may be entirely possible to define a Lattice engine that may access system calls. This may be accomplished using a complete Lattice designer with no objects involved at all to execute, run shell scripts, etc.

At some point, many compile source code to byte code. Because the language of the present invention does not require a compiler, the language of this invention may integrate with other object systems in a way that is similar to the C++ programming language as it was originally created on top of the C language (before C++ had its own compiler). However, this language may be implemented without an object system underlying it. One or more embodiments of the present language may be implemented using an internal byte code compiler approach.

1. Lattices as Self-Validating Grammars

Lattices may act as both semantics and syntax, forming a complete grammar of language. The grammar of a Lattice may be self-validating. In other words, it may be not possible to ever define a Lattice grammar that may be not syntactically correct. Lattices may, by definition be syntactically correct.

This novel achievement may be accomplished by code that may enforce syntactic correctness both at design time and runtime. The meta-Lattice may not allow a developer to edit properties that logically may not be associated with a given Lattice Element. Likewise, the runtime Lattice may not execute properties that it may not handle correctly.

This may be different than how traditional code works. For example the C++ assignment operation may be expressed as x=y. The (roughly) equivalent Assign Lattice expresses assignment in a similar fashion, in that x may be set to equal y. With the Assign Lattice however, the variables on either side of the assignment may be expressed as a path (for example, a.b.c=x.y.z). In the case of the Assign operator, the items on either of the two sides of the assignment operator may be the Sites coupled with the Lattice (see the Site Types section above). Because of this, the Assign Lattice always has exactly two Sites associated with it, one for the left side of the equal sign, and one for the right side.

2. Visual Program Development Editors

The programming language of the present invention may interact with visual program development Editors. Editors are just another member type. Declarative languages may have meta-types other than fields and functions. An Editor may be merely one meta-type that may be added for greater functionality and flexibility. An Editor may be simply a means to graphically "view" data that represents an object or Lattice in the form of a Web page or a dialog.

In this current implementation, there may be two kinds of Editors. These may be composite Editors, and singleton Editors. It may be understood that these concepts are not protectable and that such things have been done previously (in Sushi, for example). Composite Editors are made up of Editors within Editors. Composite Editors may recursively contain other composite Editors, which may in turn contain other composite Editors, just as Lattices may be recursive. Singleton Editors may or may not contain sub-Editors within them, in different embodiments of the present invention.

3. Implementing Web Services

The present invention may be also optimal for use as a kind of "glue" or middleware to connect interfaces to Web services. Web Services may represent the next step in the evolution of the Internet. Web services may specifically be created to use the Internet to run processes regardless of originating platform, thus offering hope for a real "run anywhere" solution. So far, however, the process of wrapping 3GL and 4GL applications in Web services has remained a painful one, with traditional programming approaches only slightly augmented by declarative methods such as the one Microsoft has used in Microsoft .NET. The programming language of the present invention may provide a way to rapidly speed the production of Web service creation and deployment using a visual metaphor.

Although the present invention has been described with respect to certain example embodiments, it will be apparent to those skilled in the art that the present invention is not limited to these specific embodiments. For example, instead of implementing Lattices as virtual objects using XML data types, Lattices could be implemented in C, C++, Visual Basic or other 3GL or 4GL programming language. Further, while the present invention is described as not using a compiler, a compiler specific language implementation is clearly supported by this specification and encompassed by the present invention. Additionally, while the present invention is described in terms of Lattices operating in the context of some object system, it is within the scope of the present invention as disclosed herein to define a Lattice engine that may access system calls. Such an embodiment could be accomplished using a complete Lattice designer, with no objects involved, which would execute, run shell scripts, and perform the other functions of Lattices as described herein.

The specific steps and sequences of steps described herein may be configured by a developer and may vary from one embodiment to another. Other embodiments incorporating the inventive features of the present invention will be apparent to those skilled in the art. Thus a method for a method and system of instructing a computer in a declarative computer language has been presented.

We claim:

1. A computer readable storage device having computer readable program instructions embodied thereon for programming a processor, said instructions consisting of:
   a computer software application manifesting an entirely declarative system for creating a software program comprising properties for declaratively establishing relationships between data elements, said relationships comprising descriptions of logic and data,
   wherein said entirely declarative system comprises one or more declarative lattice structures, each respective lattice having a plurality of configurable constructs comprising:
   (i) one or more declarative attributes, each attribute configurable to select an internal behavior of said respective lattice;
   (ii) one or more declarative data access sites, each site configurable to define respective data access points for accessing lattices external to said respective lattice, and
   wherein said attributes and data access sites configure each said respective lattice to complete a singular computing task, and each respective lattice is configured to instantiate and execute, either alone or in relation to other lattices of said declarative system.

2. The computer readable storage device of claim 1, wherein said one or more sites define said respective data access points for programming structures internal to said respective declarative lattice structure.

3. The computer readable storage device of claim 1, wherein said one or more sites are extensible.

4. The computer readable storage device of claim 1, wherein each respective declarative lattice structure further comprises one or more logic elements providing a plurality of available behaviors selectable by said one or more attributes.

5. The computer readable storage device of claim 1, wherein said declarative lattice structures comprise a container structure having one or more declarative elements nested therein, wherein said container structure is configured to execute said one or more programming elements within a container context.

6. The computer readable storage device of claim 5, wherein said container structure comprises one or more variables accessible within said container context.

7. The computer readable storage device of claim 6, wherein said one or more programming elements comprise one or more nested container structures.

8. The computer readable storage device of claim 6, wherein said one or more programming elements comprise a declarative primitive.

9. The computer readable storage device of claim 1, wherein said one or more declarative lattice structures comprises an assignment structure comprising a first site and a second site associated with an assignment operator.

10. The computer readable storage device of claim 9, wherein said assignment structure further comprises a configurable copy attribute to select from an assignment by reference and an assignment by copy.

11. The computer readable storage device of claim 10, wherein said assignment by copy comprises an assignment by reference to a complex data structure with a copy of a top level object of said complex data structure.

12. The computer readable storage device of claim 10, wherein said assignment by copy comprises an assignment of a recursive copy of designated data of a complex data type.

13. The computer readable storage device of claim 1, wherein said one or more declarative lattice structures comprises a call function structure having one or more sites which act as input/output parameters.

14. The computer readable storage device of claim 13, wherein said call function structure is called by non-declarative program code.

15. The computer readable storage device of claim 13, wherein said call function structure is called by one of said one or more declarative lattice structures.

16. The computer readable storage device of claim 13, wherein said call function structure comprises a call to a non-declarative function.

17. The computer readable storage device of claim 16, wherein said call to said non-declarative function comprises a call to an underlying system.

18. The computer readable storage device of claim 16, wherein said call to said non-declarative function comprises a call to legacy program code.

19. The computer readable storage device of claim 16, wherein said call to said non-declarative function comprises a call to an external procedure.

20. The computer readable storage device of claim 19, wherein said external procedure is external to a computer system in which said computer readable program code is executed.

21. The computer readable storage device of claim 1:
   wherein said one or more declarative lattice structures comprise a conditional structure having one or more conditional elements, each of said one or more conditional elements comprising a conditional expression and an associated container structure having one or more programming elements nested therein;
   wherein said conditional structure is configured to execute said associated container structure when said conditional expression is true.

22. The computer readable storage device of claim 21, wherein said conditional structure comprises a default behavior configured to execute when no conditional expression is true.

23. The computer readable storage device of claim 1, wherein said one or more declarative lattice structures comprises a dialog structure configured to generate a dialog interface.

24. The computer readable storage device of claim 23, wherein said dialog structure implements a halt in execution of said one or more declarative lattice structures.

25. The computer readable storage device of claim 24, wherein said dialog structure is associated with logic code for resuming said execution of said one or more declarative lattice structures.

26. The computer readable storage device of claim 24, wherein said dialog structure is associated with computer code for tracking a data state related to said one or more declarative lattice structures during said halt in said execution.

27. The computer readable storage device of claim 1, wherein said one or more declarative lattice structures comprises an iterator structure configurable to execute a contained declarative lattice structure a plurality of times.

28. The computer readable storage device of claim 27, wherein one of said attributes associated with said iterator structure comprises a value corresponding to a length of a collection.

29. The computer readable storage device of claim 27, wherein said iterator structure comprises one of said sites configurable to provide access to a collection of data.

30. The computer readable storage device of claim 27, wherein said iterator structure comprises an expression that determines an iterative behavior of said iterator structure.

31. The computer readable storage device of claim 1, wherein said one or more declarative program structures are extensible.

32. The computer readable storage device of claim 1, wherein said one or more declarative lattice structures comprises a message structure configurable to cause a message box to be displayed.

33. The computer readable storage device of claim 1, wherein said one or more declarative lattice structures comprises a message structure configurable to log output.

34. The computer readable storage device of claim 1, wherein said one or more declarative lattice structures comprises an exception structure configurable to detect an exception condition and throw an exception for processing by another declarative lattice structure.

35. The computer readable storage device of claim 34, further comprising one or more exception handlers nested within a hierarchy of declarative container structures, wherein one or more of said container structures are configured to pass said exception and an associated execution context state to a next higher container context in said hierarchy.

36. The computer readable storage device of claim 35, wherein said one or more exception handlers are configured to throw into said associated execution state to resume execution.

37. The computer readable storage device of claim 35, further comprising a function structure, wherein said function structure is configured to propagate said exception back to a declarative call function structure providing a current calling context for said function structure.

38. The computer readable storage device of claim 1, wherein said one or more declarative lattice structures comprises a sorting structure configurable to sort a collection of data, wherein one or more of said attributes determine a sort behavior from a plurality of available sort behaviors, and wherein one of said sites is configurable to access said collection of data.

39. The computer readable storage device of claim 1, configured to execute on an underlying system that supports said plurality of declarative lattice structures during runtime.

40. The computer readable storage device of claim 1, further comprising a plurality of declarative meta-structures corresponding respectively to a plurality of declarative lattice structure types, wherein said plurality of declarative meta-structures support one or more factory methods for generating runtime instances of said declarative lattice structure types.

41. The computer readable storage device of claim 1, wherein said one or more attributes comprise an attribute primitive.

42. The computer readable storage device of claim 41, wherein said attribute primitive comprises an attribute primitive type from the set of primitive types including:
    string;
    binary blobs;
    numeric;
    date;
    time;
    date and time;
    enumerated;
    Boolean; and
    integer.

43. The computer readable storage device of claim 1, wherein said one or more attributes comprises an attribute object.

44. The computer readable storage device of claim 43, wherein said attribute object comprises an attribute container having one or more additional attributes nested therein.

45. The computer readable storage device of claim 1, wherein one or more of said attributes are recursive.

46. The computer readable storage device of claim 1, wherein one or more of said attributes comprises one or more attribute sites.

47. A method for programming an entirely declarative language program manifesting an entirely declarative system for creating a computer software program, using a computer programming interface, the method comprising:
    providing a library of declarative elements consisting of descriptions of logic and data in predefined declarative lattice structures configured to instantiate and execute, either alone or in relation to other declarative lattice structures of said declarative language program, wherein each of said declarative lattice structures has one or more configurable meta data properties from the set of properties comprising attributes and sites;
    obtaining a container programming structure from said library;
    selecting a logical behavior associated with said container programming structure by setting one or more attributes of said container programming structure;
    nesting one or more declarative elements within said container programming structure for sequential execution within a context of said container programming structure;
    selecting a declarative structure type for one or more of said declarative elements, said declarative structure type determining a range of logical behaviors available to a respective declarative lattice structure; and
    selecting respective logical behaviors of said one or more declarative elements by setting one or more attributes of said one or more declarative elements.

48. The method of claim 47 further comprising selecting an access behavior for one or more sites on one or more of said declarative elements by setting one or more associated site attributes.

49. The method of claim 48, wherein at least one of said one or more declarative lattice structures comprises a second container programming structure, said method further comprising:
nesting one or more additional declarative elements within said second container programming structure for sequential execution within a context of said second container programming structure.

50. The method of claim 49, further comprising:
configuring one of said one or more additional declarative elements to support interrupting and resuming said sequential execution.

51. The method of claim 48 further comprising associating said one or more sites with one or more variables in said context of said container programming structure.

52. The method of claim 47, wherein said computer programming interface is a graphical user interface (GUI), said method further comprising:
providing a graphical representation of said container programming structure;
providing graphical selection elements associated with said one or more attributes of said container programming element and with said one or more attributes of said one or more declarative elements; and
presenting graphical representations of said one or more declarative programming elements within a visual border of said container programming structure.

53. The method of claim 52, further comprising:
providing one or more type selection elements associated with each of said one or more declarative elements.

54. The method of claim 47, wherein said computer programming interface comprises a textual interface, said method further comprising:
providing a textual representation of said container programming structure;
expressing said one or more attributes of said container programming structure in association with said textual representation of said container programming structure;
providing one or more textual representations of respective declarative programming elements; and
expressing said one or more attributes of said one or more declarative programming elements in association with the respective textual representation of the respective declarative programming element.

55. The method of claim 54, wherein said textual representations are presented in a computer language grammar.

56. The method of claim 47, further comprising:
instantiating a meta-data container object associated with said container programming structure;
wherein setting said one or more attributes of said container programming structure comprises setting one or more respective data values within said meta-data container object.

57. The method of claim 56, further comprising:
calling a factory method of said meta-data container object to obtain a container object implementing said container programming element.

58. The method of claim 56, further comprising:
said meta-data container object implementing said container programming element during execution of said declarative language program.

59. The method of claim 47, further comprising:
obtaining a new declarative element type.

60. The method of claim 59, wherein obtaining a new declarative programming element type comprises:
extending an existing declarative element type.

61. The method of claim 59, wherein obtaining a new declarative element type comprises:
defining a new logical behavior; and
associating one or more declarative properties with said new logical behavior.

62. The method of claim 61, wherein associating one or more declarative properties comprises:
defining one or more data points associated with said new logical behavior; and
assigning one or more sites to said data points.

63. The method of claim 61, wherein associating one or more declarative properties comprises:
defining one or more control points for said new logical behavior; and
assigning one or more attributes to said one or more control points.

64. The method of claim 47, wherein said declarative programming elements represent a fifth generation programming language (5GL).

65. The method of claim 47, wherein said one or more of said declarative programming elements are nested to implement a logic flow that captures one or more programming constructs from one or more third generation languages (3GLs) and one or more fourth generation languages (4GLs).

66. The method of claim 47, further comprising:
for one or more of said attributes and said sites, predefining a finite range of valid values that are consistent with runtime execution, such that a language grammar of said programming declarative elements is self-validating.

67. The method of claim 47, further comprising:
setting one or more runtime validation attributes on one or more of said declarative programming elements to throw an exception if an invalid assignment occurs at runtime.

68. The method of claim 47, further comprising:
said one or more declarative elements transforming into an executable construct.

69. The computer readable storage device of claim 1, wherein said computer software application manifesting said declarative programming system comprises an Integrated Development Environment (IDE).

70. The computer software application of claim 69, wherein said Integrated Development Environment (IDE) comprises comprehensive facilities and capabilities for creating computer software applications.

71. The computer readable storage device of claim 1, wherein said computer software application manifesting said declarative programming system comprises an independent plug-in for an Integrated Development Environment (IDE).

72. The computer readable storage device of claim 1, wherein said sites comprise data access points for non-declarative programming structures and systems.

73. The method of claim 48 wherein said sites comprise data access points for non-declarative programming structures and systems.

* * * * *